US012729151B2

(12) United States Patent
Rasp et al.

(10) Patent No.: US 12,729,151 B2
(45) Date of Patent: Sep. 8, 2026

(54) GLASS FOR RADIATION AND/OR PARTICLE DETECTORS

(71) Applicant: Schott AG, Mainz (DE)

(72) Inventors: Josef Rasp, Waldsassen (DE); Rainer Erwin Eichholz, Frankfurt am Main (DE)

(73) Assignee: SCHOTT AG, Mainz (DE)

( * ) Notice: Subject to any disclaimer, the term of this patent is extended or adjusted under 35 U.S.C. 154(b) by 187 days.

(21) Appl. No.: 18/475,925

(22) Filed: Sep. 27, 2023

(65) Prior Publication Data

US 2024/0109805 A1 Apr. 4, 2024

(30) Foreign Application Priority Data

Sep. 27, 2022 (EP) .................................... 22198135

(51) Int. Cl.

| | |
|---|---|
| ***C03C 3/093*** | (2006.01) |
| ***C03B 5/04*** | (2006.01) |
| ***C03C 3/087*** | (2006.01) |
| ***C03C 3/118*** | (2006.01) |

(52) U.S. Cl.

CPC ................ *C03C 3/093* (2013.01); *C03B 5/04* (2013.01); *C03C 3/087* (2013.01); *C03C 3/118* (2013.01); *C03C 2203/10* (2013.01)

(58) Field of Classification Search

None

See application file for complete search history.

(56) References Cited

U.S. PATENT DOCUMENTS

2008/0017804 A1* 1/2008 Krishnamoorthy ....... G01T 3/08 250/370.05
2018/0215652 A1* 8/2018 Sakagami ............... C03C 3/091
2019/0023982 A1* 1/2019 Fujita .................... G01T 1/2002
2022/0177352 A1* 6/2022 Petershans .............. C03C 3/089
2022/0177353 A1* 6/2022 Krüger .................... C03C 3/118
2024/0217863 A1* 7/2024 Shirai ....................... C03C 3/15
2025/0068063 A1* 2/2025 Watkins .............. H01M 4/0402
2025/0093537 A1* 3/2025 Heibel .................... G01T 3/006

FOREIGN PATENT DOCUMENTS

JP 2022-89141 A 6/2022
JP 2022-89142 A 6/2022

OTHER PUBLICATIONS

European Search Report dated Feb. 3, 2023 for European Patent Application No. 22198135.0 (4 pages).

* cited by examiner

*Primary Examiner* — Amber R Orlando
*Assistant Examiner* — Paul Alan Forsyth
(74) *Attorney, Agent, or Firm* — TAYLOR & EDELSTEIN, PC

(57) ABSTRACT

A glass has a transmittance at a reference thickness of 1.0 mm of at least 65.0% at a wavelength of 260 nm. An amount of ZrO2 in the glass is less than 150 ppm.

10 Claims, 5 Drawing Sheets

GLASS FOR RADIATION AND/OR PARTICLE DETECTORS

CROSS REFERENCE TO RELATED APPLICATIONS

This application claims priority to European Patent Application No. 22198135.0 filed on Sep. 27, 2022, which is incorporated in its entirety herein by reference.

BACKGROUND OF THE INVENTION

1. Field of the Invention

The present disclosure relates to a glass for radiation detectors, in particular neutron detectors, UV detectors and neutrino detectors. The disclosure also relates to a method of producing such a glass and to the uses of such glass in radiation and/or particle detectors, in particular in neutron detectors, UV detectors or neutrino detectors.

2. Description of the Related Art

Radiation and/or particle detectors often comprise glass articles, such as lenses, covers, glass fibers, etc., which may not interfere with the measurement.

However, raw materials as well as production processes may contaminate glasses with materials which do interfere with certain radiations and/or particles. For example, certain components in the glass comprise elements with neutron-absorption and/or UV-absorption abilities. Some of these glass elements may even show weak nuclear radiation, which may have a further impact on the actual measurement.

For example, most conventional glasses comprise Zr, Hf, as well as other contaminations such as Fe, Ti and/or Pt. Hf is at least, in some isotopes, radioactive and has neutron absorption capacity. Zr and Hf are chemically closely related so that Zr-contaminations always also include Hf contaminations. Pt, Ti, and Fe, for example, absorb UV-light of certain wavelengths. Thus, such contaminated glasses are not particularly useful for radiation and/or particle detection devices, in particular neutron detection devices, UV detectors or neutrino detection devices.

Furthermore, since different physical effects are used in certain detectors at the same time, e.g., neutron detectors work by neutron absorption but also by scintillation which relies on the detection of UV-radiation, UV-radiation detection is interfered both by UV-absorption as well as by residual radioactivity, etc., glasses with contaminations interfere with the radiation and/or particle detection on several levels, rendering it difficult to compensate all detection errors.

Thus, the need in the prior art exists to provide glasses which are particularly useful for radiation and/or particle detection devices, in particular neutron detection devices, UV detectors or neutrino detection devices.

SUMMARY OF THE INVENTION

In the present disclosure novel glass compositions and uses of the same are presented, which are essentially free of Zr and Hf (as well as the corresponding oxides $ZrO_2$ and $HfO_2$), as well as other contaminations such as Fe, Ti and/or Pt, and therefore particularly useful for radiation detection devices, in particular neutron detection devices, neutrino detection devices and UV-detection devices. Additionally, the glasses presented hereinunder also show excellent UV-transmittance, which is of further benefit, especially when used in scintillation detectors.

In some embodiments provided according to the disclosure, a glass has a transmittance at a reference thickness of 1.0 mm of at least 65.0% at a wavelength of 260 nm. An amount of $ZrO_2$ in the glass is less than 150 ppm.

In some embodiments provided according to the disclosure, a method of producing a glass includes: melting glass raw materials in a melting tank containing refractory material to produce a glass melt, the glass melt coming into contact with the refractory material of the melting tank, a proportion of $ZrO_2$ in the refractory material of the melting tank being less than 5 wt.-%; and cooling the glass melt to produce the glass, the glass having a transmittance at a reference thickness of 1.0 mm of at least 65.0% at a wavelength of 260 nm and an amount of $ZrO_2$ in the glass is less than 150 ppm.

In some embodiments provided according to the disclosure, a radiation and/or particle detector includes a glass having a transmittance at a reference thickness of 1.0 mm of at least 65.0% at a wavelength of 260 nm. An amount of $ZrO_2$ in the glass is less than 150 ppm.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
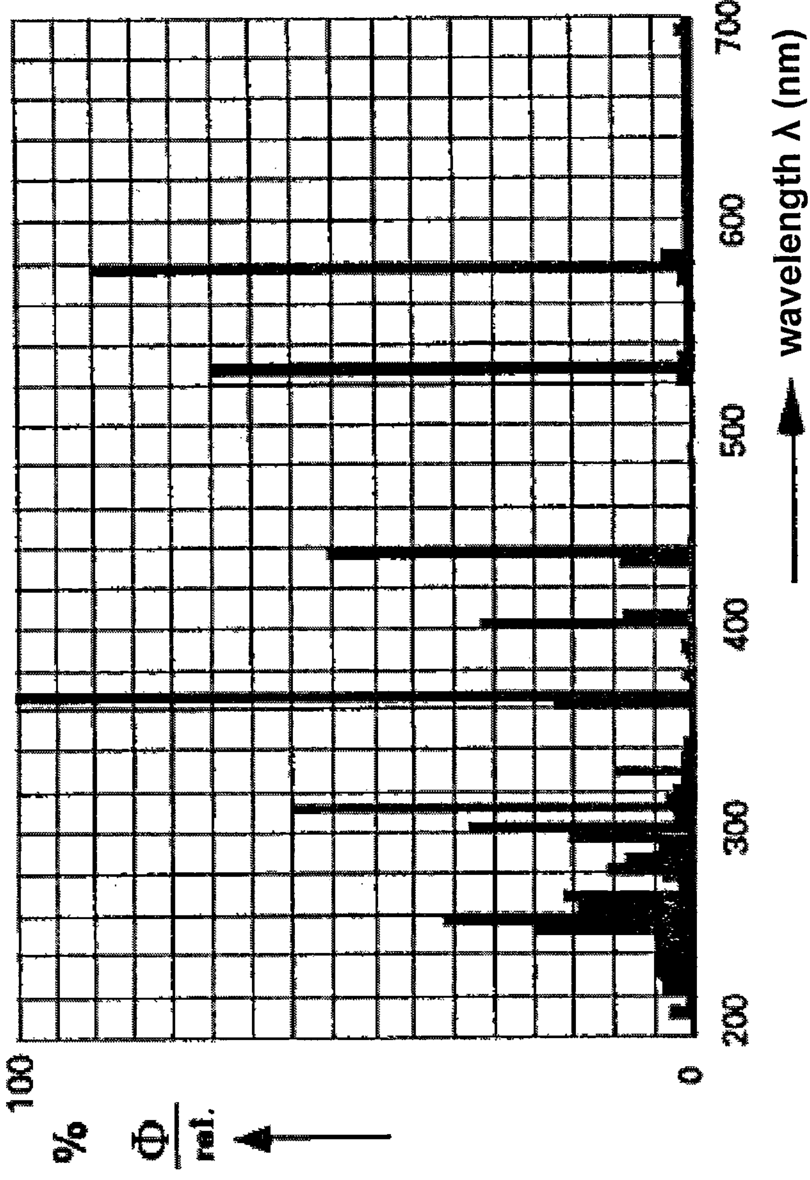
FIG. 1 shows the emission spectrum of an HOK 4 lamp, where the x-axis shows the wavelength in nm and the y-axis shows the relative intensity in comparison to the maximum intensity.

In one aspect of the present disclosure, it has been found that conventional materials used for refractory crucibles, such as aluminum-zirconium-silicate (AZS, known under the trade-name Zirkosit® S32, S32 N, S32 KLP, S32 KLS, M36, M36 N, M36 EL, M36 KLB, M36 KLP, M36 KLS, etc.) or $Al_2O_3$-containing materials ($Al_2O_3$-contents of between 45-95 wt.-%; known as Korvisit® AB, AB N, AB KLP, AB KLS, A, etc.) inevitably result in the contamination of the glass melt with elements such as Fe, Ti, Pt, Ga, Zr, etc. (or oxides thereof). This again results in glasses that show neutron absorption, UV-absorption and residual radioactivity which renders them less useful for radiation detection devices, in particular neutron detection devices, neutrino detection devices and UV-detection devices.

Neutron Detection

Neutron detection is the effective detection of neutrons entering a well-positioned detector. The most common hardware to detect neutrons today is the scintillation detector. Scintillation neutron detectors include liquid organic scintillators, crystals, plastics, glass, and scintillation fibers.

Scintillating $^{6}Li$ glass for neutron detection was first reported in the scientific literature in 1957 and key advances were made since then. The scintillating glass fibers work by incorporating $^{6}Li$ and $Ce^{3+}$ into the glass bulk composition. The $^{6}Li$ has a high cross-section for thermal neutron absorption through the $^{6}Li(n,\alpha)$ reaction. Neutron absorption produces a tritium ion, an alpha particle, and kinetic energy. The alpha particle and tritium interact with the glass matrix to produce ionization, which transfers energy to $Ce^{3+}$ ions and results in the emission of photons with wavelength 390 nm-600 nm as the excited state $Ce^{3+}$ ions return to the ground state.

The event results in a flash of light of several thousand photons for each neutron absorbed. A portion of the scintillation light propagates through the glass fiber, which acts as a waveguide. The fiber ends are optically coupled to a pair of photomultiplier tubes (PMTs) to detect photon bursts. The detectors can be used to detect both neutrons and gamma rays, which are typically distinguished using pulse-height discrimination. Substantial effort and progress in reducing fiber detector sensitivity to gamma radiation has been made. Original detectors suffered from false neutrons in a 0.02 mR gamma field. Design, process, and algorithm improvements now enable operation in gamma fields up to 20 mR/h (60Co).

The glass used for these Scintillating $^{6}Li$ glass fibers of course needs to contain as little contaminations as possible with elements that absorb neutrons and therefore may interfere with the signal. Although neutrons do not interact much with matter, certain elements, such as for example hafnium (Hf), do interact with neutrons by absorption and scattering. Hf shows effective absorption of thermal and epithermal neutrons and a partial recovery of absorbing properties during prolonged irradiation in neutron fluxes. For example, neutron-absorption of Hf is 600 times higher than the chemical closely related zirconium (Zr).

Due to lanthanide contraction, Zr and Hf show similar atomic and ionic size. Zr—Hf have almost identical sizes. They have similar number of valence electrons and similar properties and therefore are called chemical twins. Due to this close chemical relationship, if Zr is present in a composition, Hf is present as well.

The inventive glasses, however, comprise little or no Zr (and Hf), thus, the scintillating fiber detectors made thereof have excellent sensitivity, and have fast timing (~60 ns) so that a large dynamic range in counting rates is possible. The detectors have the advantage that they can be formed into any desired shape and can be made very large or very small for use in a variety of applications. Further, they do not rely on $^{3}He$ or any raw material that has limited availability, nor do they contain toxic or regulated materials. Their performance matches or exceeds that of $^{3}He$ tubes for gross neutron counting due to the higher density of neutron absorbing species in the solid glass compared to high-pressure gaseous $^{3}He$. Even though the thermal neutron cross section of $^{6}Li$ is low compared to $^{3}He$ (940 barns vs. 5330 barns), the atom density of $^{6}Li$ in the fiber is fifty times greater, resulting in an advantage in effective capture density ratio of approximately 10:1.

Neutrino Detection

Well-known neutrino detectors are on the one hand the radiochemical detectors (e.g., the chlorine experiment in the Homestake gold mine, USA or the GALLEX detector in the Gran Sasso tunnel in Italy), on the other hand the detectors based on the Cherenkov effect, here most notably the Sudbury Neutrino Observatory (SNO) and Super-Kamiokande. They detect solar and atmospheric neutrinos and allow the measurement of neutrino oscillations and thus conclusions about the differences in neutrino masses, since the reactions taking place in the interior of the sun and thus the neutrino emission of the sun are well known. Experiments such as the Double Chooz experiment or the KamLAND detector in the Kamioka Neutrino Observatory, which has been working since 2002, are able to detect geoneutrinos and reactor neutrinos via inverse beta decay and provide complementary information from a range that solar neutrino detectors cannot is covered.

It is apparent that radioactive decay of other origin renders neutrino detection difficult or even impossible, thus, any material used in neutrino-detectors need to be free of such elements.

UV-Detection

It was also found that radioactive emissions affect the signal-to-noise ratio in UV detectors. Radioactive emission of current UV-transmitting glasses is to a large part due to the presence of radioactive isotopes of hafnium. Radioactive isotopes of hafnium emit alpha and gamma radiation.

Natural hafnium is composed of six isotopes: $^{174}Hf$ (0.16%), $^{176}Hf$ (5.26%), $^{177}Hf$ (18.6%), $^{178}Hf$ (27.28%), $^{179}Hf$ (13.62%), $^{180}Hf$ (35.08%). The resonance integrals of natural hafnium for neutron capture cross sections in the energy range from 1.0 to 100 keV are between 1900 and 2300 barns. A barn (symbol: b) is a metric unit of area equal to 10-28 $m^2$ (100 $fm^2$). It is used in nuclear physics to express the cross sections of any scattering process and is best understood as a measure of the probability of interaction between small particles. A barn is approximately the cross-sectional area of a uranium nucleus. While the barn never was an SI unit, the SI standards body acknowledged it in the 8th SI Brochure (superseded in 2019) due to its use in particle physics.

Hafnium chemically resembles zirconium and is found in many zirconium minerals. Therefore, contaminations of the glass composition with $ZrO_2$ are inevitably associated with contaminations with $HfO_2$.

Conventional UV transmitting glass compositions have very high melting temperatures. Thus, very heat-resistant refractory materials are needed for glass production. It was found that contamination of UV-transmitting glasses with $ZrO_2$ are mainly based on the use of refractory materials containing zirconium during production of the glass. Such refractory materials may for example come into contact with the glass melt as part of crucibles, melting tanks, refining tanks, and other apparatuses used during production of the glass.

The present disclosure overcomes this problem by avoiding refractory materials containing zirconium during production of the glass. The glass thus obtained has reduced radioactive emission.

Photomultipliers and photodiodes are detectors that are typically constructed with an evacuated glass housing. Radioactive emission from the glass results in increased background noise because the detectors are not only sensitive to incoming photons but to radioactive radiation as well so that an electrical current is generated by both incoming light and incoming radioactivity. Therefore, radioactivity compromises detection of the light signal of interest by producing an increased noise that results in a deteriorated signal-to-noise-ratio (S/N).

Thus, the glass provided according to this disclosure has an emission of alpha particles of less than 40.1 Becquerel per gram, of less than 31.6 Becquerel per gram, of less than 4.42 Becquerel per gram, of less than 2.21 Becquerel per gram, of less than 1.106 Becquerel per gram, or of less than 0.553 Becquerel per gram.

Neutrino detectors may be composed of a large volume of clear material such as water or ice surrounded by light-sensitive photomultiplier tubes. Neutrinos can interact with atomic nuclei to produce charged leptons which generate radiation that can be detected by the photomultipliers. Radioactive emission from the glass housing of the photomultipliers strongly interferes with neutrino detection.

Another drawback of radioactive emission from the glass is that it is associated with solarization which in turn reduces transmittance of the glass. Therefore, radioactivity emitting glasses have a reduced lifetime in applications requiring high transmittance, in particular high UV transmittance.

In another aspect, the disclosure relates to a glass having a transmittance (at a reference thickness of 1.0 mm) of at least 65.0% at a wavelength of 260 nm, wherein the amount of $ZrO_2$ in the glass is less than 150 ppm, or less than 140 ppm, or less than 130 ppm, or less than 120 ppm, or less than 110 ppm, or less than 50 ppm, or less than 20 ppm, or less than 10 ppm, or less than 5 ppm. Optionally the glass is free of Zr.

In some embodiments, the disclosure relates to a glass, wherein the amount of one or more of $Fe_2O_3$, $MoO_3$ and $WO_3$ in the glass is less than 10 ppm, or less than 5 ppm, or less than 1 ppm.

In some embodiments, the disclosure relates to a glass, wherein the amount of $TiO_2$ in the glass is less than 20 ppm, or less than 15 ppm, or less than 10 ppm.

In some embodiments, the disclosure relates to a glass, wherein the amount of one or more of gallium, uranium, thorium, yttrium and thallium, as well as oxides thereof and isotopes, in the glass is at most 300 ppm, at most 250 ppm, at most 200 ppm, at most 150 ppm, at most 100 ppm, at most 50 ppm, at most 25 ppm, at most 10 ppm, at most 5 ppm, at most 3 ppm, or at most 1 ppm.

UV detectors generally include a photodiode or photomultiplier that converts the UV light into an electrical current. Often there is an additional translucent protective window in front of the photodiode, or it is located in transparent encapsulation material. In order not to deteriorate the performance of the UV detector it is important that the protective window or encapsulation material has a high UV transmittance. For example, UV-transmitting glass may be used for this purpose due to its high UV-transmittance.

However, one problem arising in this context is that the signal-to-noise ratio (SNR or S/N) of UV detectors may be compromised, in particular due to reduced signal, due to increased noise, or due to a combination of both. Obtaining UV detectors with particularly high S/N is desired, in particular in applications in which a low signal has to be detected and/or in which the accuracy of detection is of particular importance. However, UV detectors with high S/N are difficult to obtain. For example, measures that may increase signal detection are often also associated with increased noise and vice versa. Therefore, it would be desirable to have UV detectors with improved S/N. This is particularly the case for UV detectors including an additional translucent protective window in front of the photodiode and for UV detectors having a photodiode being located in transparent encapsulation material.

Glass Compositions

The glasses provided according to the present disclosure have a high UV transmittance, in particular a transmittance (at a reference thickness of 1.0 mm) of at least 65.0% at a wavelength of 260 nm.

Optionally, the glass provided according to the disclosure has a transmittance at a wavelength of 260 nm of at least 65.0%, for example at least 66.0%, at least 67.0%, at least 68.0%, at least 69.0%, at least 70.0%, optionally at least 71.0%, optionally at least 72.0%, optionally at least 73.0%, optionally at least 74.0%, optionally at least 75.0%, optionally at least 76.0%, optionally at least 77.0%, optionally at least 78.0%, optionally at least 79.0%, or optionally at least 80.0%. Transmittance values in the present disclosure refer to a reference thickness of 1.0 mm of the glass if not indicated otherwise. That does not mean that the glass necessarily has to have a thickness of 1.0 mm. Rather, the reference thickness simply indicates what the transmittance would be if the glass had a thickness of 1.0 mm. The transmittance at a reference thickness may be determined by measuring the transmittance of a sample having a thickness of 1.0 mm. Alternatively, the transmittance at a thickness of 1.0 mm may also be determined by measuring the transmittance at another sample thickness, for example at a sample thickness of 0.7 mm, and then extrapolating what the transmittance would be at a thickness of 1.0 mm. Generally speaking, the extrapolation of a transmittance T1 at a thickness d1 to a transmittance T2 at a thickness d2 can be done using the following formula:

$$T2=((T1/P)^{\wedge}(d2/d1))*P, \text{ wherein } P \text{ is the wavelength-dependent reflection coefficient}$$

($P=P(\lambda)$) given in the unit "%". P can be determined via the Sellmeier n coefficient.

In some embodiments, the transmittance at a wavelength of 260 nm may be at most 99.0%, at most 97.5%, at most 95.0%, at most 94.0%, at most 93.0%, at most 92.0%, at most 91.0%, at most 90.0%, at most 89.0%, at most 88.0%, at most 87.0%, at most 86.0%, at most 85.0%, at most 84.0%, at most 83.0%, at most 82.0% (at a reference thickness of 1.0 mm). The transmittance at a wavelength of 260 nm may for example be in a range of from 65.0% to 99.0%, from 66.0% to 97.5%, from 67.0% to 95.0%, from 68.0% to 94.0%, from 69.0% to 93.0%, from 70.0% to 92.0%, from 71.0% to 91.0%, from 72.0% to 90.0%, from 73.0% to 89.0%, from 74.0% to 88.0%, from 75.0% to 87.0%, from 76.0% to 86.0%, from 77.0% to 85.0%, from 78.0% to 84.0%, from 79.0% to 83.0%, or from 80.0% to 82.0%.

The glasses provided according to the disclosure are characterized by a particularly high solarization resistance. The solarization resistance can be determined by irradiating the glass with a HOK 4 lamp for 144 hours and comparing the transmittance (at a reference thickness of 1.0 mm) at a wavelength of 260 nm before and after irradiation. The term "HOK 4 lamp" refers to the high pressure mercury-vapor lamp HOK 4/120 of Phillips. The emission spectrum of the HOK 4 lamp is shown in FIG. 1. The main emission of the lamp is at a wavelength of 365 nm. The power density at 200-280 nm in a distance of 1 m is 850 μW/cm2. For the irradiation for 144 hours of the present disclosure, the distance between the HOK 4 lamp and the sample is chosen to be 7 cm.

The lower the difference between the transmittance before and after irradiation is, the higher is the solarization resistance. For example, there may be two glasses, each having a transmittance (at a reference thickness of 1.0 mm) of 80% at a wavelength of 260 nm (before irradiation). After irradiation with the HOK 4 lamp for 144 hours, the transmittance may be 75% for the first glass and 70% for the second glass. Thus, the difference between transmittance (at a reference thickness of 1.0 mm) at a wavelength of 260 nm prior to irradiation with the HOK 4 lamp and transmittance (at a reference thickness of 1.0 mm) at a wavelength of 260 nm after irradiation with the HOK 4 lamp for 144 hours is 5% for the first glass and 10% for the second glass. Hence, the solarization resistance of the first glass is higher as compared to the second glass because the difference between the transmittance before and after irradiation is lower for the first glass as compared to the second glass. A high solarization resistance is associated with low solarization and vice versa. A high solarization correlates with a high induced extinction $Ext_{ind}$.

The induced extinction $Ext_{ind}$ can be determined based on the transmittance before and after irradiation with the HOK 4 lamp for 144 hours and the thickness of the glass sample using the following formula:

$$Ext_{ind} = -\frac{\ln\frac{T_{after}}{T_{before}}}{d}$$

$Ext_{ind}$ is the induced extinction, $T_{after}$ is the transmittance after irradiation with the HOK 4 lamp for 144 hours, $T_{before}$ is the transmittance before irradiation with the HOK 4 lamp for 144 hours, d is the sample thickness, and ln is the natural logarithm. If not indicated otherwise, the sample thickness d is given in cm so that the induced extinction is given in 1/cm. If not indicated otherwise, the transmittance before and after irradiation with the HOK 4 lamp are given for a wavelength of 260 nm. Thus, the induced extinction as described in the present disclosure refers to the induced extinction at a wavelength of 260 nm if not indicated otherwise.

In some embodiments, the induced extinction at a wavelength of 260 nm is at most 3.5/cm, at most 3.2/cm, at most 3.0/cm, at most 2.9/cm, at most 2.8/cm, at most 2.7/cm, at most 2.6/cm, at most 2.5/cm, at most 2.4/cm, at most 2.3/cm, at most 2.2/cm, at most 2.1/cm, at most 2.0/cm, at most 1.9/cm, at most 1.8/cm, at most 1.7/cm, at most 1.6/cm, at most 1.5/cm, at most 1.4/cm, or at most 1.3/cm. The induced extinction at a wavelength of 260 nm may for example be at least 0.01/cm, at least 0.02/cm, at least 0.05/cm, at least 0.1/cm, at least 0.2/cm, at least 0.3/cm, at least 0.4/cm, at least 0.5/cm, at least 0.55/cm, at least 0.6/cm, at least 0.65/cm, at least 0.7/cm, at least 0.75/cm, at least 0.8/cm, at least 0.85/cm, at least 0.9/cm, at least 0.95/cm, at least 1.0/cm, at least 1.05/cm, or at least 1.1/cm. The induced extinction at a wavelength of 260 nm may for example be from 0.01/cm to 3.5/cm, from 0.02/cm to 3.2/cm, from 0.05/cm to 3.0/cm, from 0.1/cm to 2.0/cm, from 0.2/cm to 2.8/cm, from 0.3/cm to 2.7/cm, from 0.4/cm to 2.6/cm, from 0.5/cm to 2.5/cm, from 0.55/cm to 2.4/cm, from 0.6/cm to 2.3/cm, from 0.65/cm to 2.2/cm, from 0.7/cm to 2.1/cm, from 0.75/cm to 2.0/cm, from 0.8/cm to 1.9/cm, from 0.85/cm to 1.8/cm, from 0.9/cm to 1.7/cm, from 0.95/cm to 1.6/cm, from 1.0/cm to 1.5/cm, from 1.05/cm to 1.4/cm, or from 1.1/cm to 1.3/cm.

In some embodiments, the glass provided according to the disclosure is characterized by a high UV transmittance and a low induced extinction. This combination is associated with a high transmittance (at a reference thickness of 1.0 mm) at a wavelength of 260 nm after irradiation with the HOK 4 lamp for 144 hours. The transmittance (at a reference thickness of 1.0 mm) at a wavelength of 260 nm after irradiation with the HOK 4 lamp for 144 hours may for example be at least 54.0%, at least 55.0%, optionally at least 56.0%, optionally at least 57.0%, optionally at least 58.0%, optionally at least 59.0%, optionally at least 60.0%, optionally at least 61.0%, optionally at least 62.0%, optionally at least 63.0%, optionally at least 64.0%, optionally at least 65.0%, optionally at least 66.0%, optionally at least 67.0%, optionally at least 68.0%, optionally at least 69.0%, optionally at least 70.0%, optionally at least 71.0%, optionally at least 72.0%, optionally at least 73.0%, or optionally at least 74.0%.

The transmittance (at a reference thickness of 1.0 mm) at a wavelength of 260 nm after irradiation with the HOK 4 lamp for 144 hours may, for example, be at most 95.0%, at most 94.0%, at most 93.0%, at most 92.0%, at most 91.0%, at most 90.0%, at most 89.0%, at most 88.0%, at most 87.0%, at most 86.0%, at most 85.0%, at most 84.0%, at most 83.0%, at most 82.0%, at most 81.0%, at most 80.0%, at most 79.0%, at most 78.0%, at most 77.0%, at most 76.0%, or at most 75.0%. The transmittance at a wavelength of 260 nm may, for example, be in a range of from 54.0% to 95.0%, from 55.0% to 94.0%, from 56.0% to 93.0%, from 57.0% to 92.0%, from 58.0% to 91.0%, from 59.0% to 90.0%, from 60.0% to 89.0%, from 61.0% to 88.0%, from 62.0% to 87.0%, from 63.0% to 86.0%, from 64.0% to 85.0%, from 65.0% to 84.0%, from 66.0% to 83.0%, from 67.0% to 82.0% from 68.0% to 81.0%, from 69.0% to 80.0%, from 70.0% to 79.0%, from 71.0% to 78.0%, from 72.0% to 77.0%, from 73.0% to 76.0%, or from 74.0% to 75.0%.

In some embodiments, the disclosure relates to a glass comprising the following components:

| Component | Content |
|---|---|
| $Si^{4+}$ | 52-71 cat % |
| $Al^{3+}$ | 0-8 cat % |
| $B^{3+}$ | 0-35 cat % |
| $Li^{+}$ | 0-7 cat % |
| $Na^{+}$ | 0-17 cat % |
| $K^{+}$ | 0-14 cat % |
| $Mg^{2+}$ | 0-6 cat % |
| $Ca^{2+}$ | 0-2 cat % |
| $Sr^{2+}$ | 0-4 cat % |
| $Ba^{2+}$ | 0-4 cat % |
| Sum of $R^{+}$ | 5-30 cat % |
| Sum of $R^{2+}$ | 0-5 cat % |

In some embodiments, $F^-$ may be present in the glass with 0-3 wt.-% and/or $Cl^-$ may be present in the glass with 0-1 wt.-% relative to the total weight of the glass composition. At least 96 wt.-%, at least 97 wt.-%, at least 98 wt.-%, at least 99 wt.-%, or up to 100 wt.-% of the anions may be oxygen. Oxygen may be present as the oxide of the respective cation, i.e., as $R_2O$ or RO, for example in form of $SiO_2$, $Al_2O_3$, $B_2O_3$, $Li_2O$, $Na_2O$, $K_2O$, MgO, CaO, SrO, BaO, etc.

"Cat %" describes "cation percent", which refers to the relative, molar proportions of the cations to the total amount of cations in the glass. Of course, the glass also contains anions.

"$R^+$" describes the sum of all cations of all alkali metals in the glass. "$R^{2+}$" describes the sum of all cations of all alkaline earth metals in the glass.

The glasses provided according to the present disclosure can comprise $Si^{4+}$ in a proportion of at least 52 cat %. $Si^{4+}$ contributes to the hydrolytic resistance and transparency of the glass. At an excessively high content of $Si^{4+}$, the melting point of the glass is too high. The temperatures $T_4$ and $T_g$ then also increase greatly. For this reason, the content of $Si^{4+}$ has to be limited to not more than 71 cat %. The content of $Si^{4+}$ is optionally at least 52 cat %, at least 53 cat %, or at least 54 cat %. In some embodiments, the content can be restricted to not more than 70 cat %, not more than 69 cat %, or not more than 68 cat %.

The glasses provided according to the present disclosure contain $Al^{3+}$ in a proportion of not more than 8 cat %. $Al^{3+}$ in larger proportions reduces the acid resistance. In addition, $Al^{3+}$ increases the melting point and $T_4$. The content of this component can thus be limited to a maximum of 7 cat %, or a maximum of 6 cat %. In some embodiments, $Al^{3+}$ is used in a small proportion of at least 0.25 cat %, at least 0.5 cat %, at least 0.75 cat %, at least 1.15 cat %, at least 1.25 cat %, at least 1.5 cat % or at least 1.75 cat %, or at least 2.0 cat %.

The glasses provided according to the present disclosure can contain $B^{3+}$ in a proportion of at least 1.0 cat %. $B^{3+}$ has an advantageous effect on the melting properties of the glass: in particular, the melting point is reduced, and the glass can be fused to other materials at lower temperatures. Too much $B^{3+}$ has adverse effects on the hydrolytic resistance and the glass tends to suffer from high evaporation losses during production and thus to a lumpy glass. It can be restricted to up to 35 cat %, up to 32 cat %, or up to 31.5 cat %. In some embodiments, the content of $B^{3+}$ is not more than 30.5 cat %. The content of $B^{3+}$ can be at least 1.15 cat %, at least 1.25 cat %, at least 1.5 cat %, at least 2.0 cat %, at least 2.25 cat %, at least 2.5 cat %, at least 2.75 cat %, or at least 2.8 cat %.

The glasses provided according to the present disclosure can contain $Li^+$ in a proportion of up to 8 cat %, up to 7 cat %, or up to 6.5 cat %. $Li^+$ increases the fusibility of the glasses and results in an advantageous shift of the UV edge to shorter wavelengths. However, lithium oxide has a tendency to vaporise and also increases the price of the mix. In some embodiments, the glass contains only little $Li^+$, e.g., not more than 0.5 cat %, not more than 0.25 cat % or not more than 0.15 cat %, or the glass is free of $Li^+$. In some embodiments, the glass contains $Li^+$ between 0.01 and 8 cat %, between 0.025 and 7 cat %, or between 0.05 and 6.5 cat %.

The glasses provided according to the disclosure contain $Na^+$ in a proportion of up to 17 cat %. $Na^+$ increases the fusibility of the glasses. However, sodium oxide also leads to a reduction in the UV transmittance and to an increase in the coefficient of thermal expansion. The glass can comprise $Na^+$ in a proportion of at most 16 cat %, or at most 15 cat %. In some embodiments, the content of $Na^+$ is more than 2.0 cat %, or more than 3.0 cat %.

The glasses provided according to the present disclosure contain $K^+$ in a proportion of not more than 14 cat %. $K^+$ increases the fusibility of the glass and results in an advantageous shift of the UV edge to shorter wavelengths. Its proportion can be at least 0.5 cat % or at least 0.75 cat %. However, an excessively high potassium oxide content leads, due to the radioactive property of its isotope $^{40}K$, to a glass which is unsuitable for use in photomultipliers. For this reason, the content of this component has to be restricted to not more than 13 cat %, or not more than 12 cat %. The glass can comprise $K^+$ in a proportion of at least 0.5 cat %, or at least 0.75 cat %. In some embodiments, the content of $K^+$ is between 0.5 cat % and 14 cat %, or between 0.75 cat % and 13 cat %.

The glasses provided according to the present disclosure can contain $Mg^{2+}$ in a proportion of up to 2 cat %, or up to 1 cat %. $Mg^{2+}$ is advantageous for the fusibility but in high proportions has been found to be problematical in respect of the desired UV transmittance. Some embodiments are free of $Mg^{2+}$.

The glasses provided according to the present disclosure can contain $Ca^{2+}$ in a proportion of up to 2 cat %, or up to 1 cat %. $Ca^{2+}$ is advantageous for the fusibility but in high proportions has been found to be problematical in respect of the desired UV transmittance. Some embodiments are free of $Ca^{2+}$.

The glasses provided according to the present disclosure can contain $Sr^{2+}$ in a proportion of up to 2 cat %, up to 1 cat %, or up to 0.5 cat %. $Sr^{2+}$ is advantageous for the fusibility but in high proportions has been found to be problematical in respect of the desired UV transmittance. Some embodiments are free of $Sr^{2+}$ or contain only little $Sr^{2+}$, e.g., at least 0.01 cat %, at least 0.025 cat %, at least 0.05 cat %, or at least 0.1 cat %. Some embodiments are free of $Sr^{2+}$.

The glasses provided according to the present disclosure can contain $Ba^{2+}$ in a proportion of up to 4 cat %, or up to 3 cat %. $Ba^{2+}$ leads to an improvement in the hydrolytic resistance. However, an excessively high barium oxide content leads to instability of the glass. Some embodiments contain $Ba^{2+}$ in proportions of at least 0.01 cat %, at least 0.05 cat %, or at least 0.1 cat %.

The glasses provided according to the present disclosure can contain $F^-$ in an amount of from 0 to 3 wt.-% relative to the total weight of the glass composition. The content of $F^-$ is optionally not more than 2 wt.-%. In some embodiments, at least 0.1 wt.-%, or at least 0.3 wt.-% of this component is used. The component $F^-$ improves the fusibility of the glass and influences the UV edge in the direction of shorter wavelengths.

The glasses provided according to the present disclosure can comprise $Cl^-$ in an amount of less than 1 wt.-% relative to the total weight of the glass composition, in particular less than 0.5 wt.-%, or less than 0.4 wt.-%. Suitable lower limits are 0.01 wt.-%, or 0.05 wt.-%.

In some embodiments, the ratio of the sum of the contents (in cat %) of $B^{3+}$, $R^{2+}$ and $R^+$ to the sum of the contents (in cat %) of $Si^{4+}$ and $Al^{3+}$ is not more than 0.8, in particular not more than 0.75, or optionally not more than 0.73. In some embodiments, this value is at least 0.1, optionally at least 0.2, or at least 0.3. Glasses having the specified ratio of proportions display good properties in respect of the hydrolytic resistance and have only a low induced extinction, which has many advantages when used, in particular, as UV-transparent material.

In some embodiments of the disclosure, the ratio of the contents of $Na^+$ to $K^+$ in cat % is at least 0.5, in particular at least 0.75. In some embodiments, the specified ratio is not more than 4, in particular not more than 3. Both oxides serve to improve the fusibility of the glass. However, if too much $Na^+$ is used, the UV transmittance is decreased. Too much $K^+$ increases the coefficient of thermal expansion. It has been found that the ratio indicated achieves the best results, i.e., the UV transmittance and the coefficient of thermal expansion are in advantageous ranges.

The sum of $R^{2+}$ in the glasses provided according to the present disclosure is optionally not more than 30 cat %, not more than 29 cat %, or not more than 27 cat %. The glasses can contain the sum of $R^{2+}$ of at least 6.5 cat %, at least 7.5 cat %, or at least 8 cat %. Alkali metal oxides increase the fusibility of the glasses but, as described above, in higher proportions lead to many disadvantages.

It has been found that the alkaline earth metal oxides $R^+$ have a large influence on the hydrolytic resistance. In some embodiments, particular attention is therefore paid to the contents of these components and their ratio to one another. Thus, the ratio of $Ba^{2+}$ in cat % to the sum of the contents of $Mg^{2+}$, $Sr^{2+}$ and $Ca^{2+}$ in cat % should be at least 0.5. This value is optionally at least 0.6, at least 0.7. $Ba^{2+}$ brings the most advantages in respect of hydrolytic resistance compared to the other alkaline earth metal oxides. Nevertheless, the specified ratio should not exceed a value of 2 or of 1. In some embodiments, the glass comprises at least small amounts of $Ba^{2+}$ and is free of $Mg^{2+}$ and/or $Sr^{2+}$ and/or $Ca^{2+}$.

Advantageous properties are obtained particularly when the ratio of the proportion of $Ca^{2+}$ in the glass to $Ba^{2+}$, in each case in cat %, is less than 3.0. In particular, this ratio should be less than 2.5, or less than 2. Exemplary ratios are even lower, in particular less than 1.75, or less than 1.5. In some embodiments, this ratio is 0.

In some embodiments, the glass has a ratio of $B^{3+}$ to $Ba^{2+}$ in cat % of at least 0.5 and not more than 85. The ratio is optionally at least 1, or at least 1.1. In some embodiments, the specified ratio is restricted to not more than 84, not more than 83, not more than 82, or not more than 81. In particular, the ratio is at least 1.2 and not more than 81. Glasses having the specified ratio of proportions display good properties in respect of the hydrolytic resistance and an only small, induced extinction.

The sum of $R^+$ in the glasses provided according to the present disclosure can be at least 0.5 cat %, or at least 0.7 cat %. Alkaline earth metal oxides are advantageous for the fusibility but in large proportions have been found to be problematical in respect of the desired UV transmittance. In some embodiments, the glass contains not more than 4 cat %, or not more than 3 cat %, or not more than 2.5 cat % of $R^+$.

The sum of the contents in cat % of the alkaline earth metal oxides and alkali metal oxides, $R^++R^{2+}$, can be limited to not more than 30 cat %. Exemplary embodiments can contain these components in amounts of not more than 29 cat %. The content of these oxides is optionally at least 2 cat %, at least 2.5 cat %, or at least 3 cat %. These components in excessively enlarged proportions reduce the hydrolytic resistance of the glasses.

The ratio of the contents in cat % of $B^{3+}$ to the sum of the contents of $R^{2+}$ and $R^+$ in cat % can be at least 0.04, at least 0.05, or at least 0.068. The ratio can be limited to a maximum of 9, a maximum of 8.5, or a maximum of 8. Alkali metal borates or alkaline earth metal borates can be formed when too much alkali metal oxide or alkaline earth metal oxide relative to $B^{3+}$ is present. It has been found to be advantageous to set the ratio indicated.

For the melting properties, including $T_g$ and $T_4$, to be in the desired range, it can be advantageous to set the ratio of the content of $B^{3+}$ to the sum of the contents of $Si^{4+}$ and $Al^{3+}$ in cat % within a narrow range. In some embodiments, this ratio is at least 0.03 and/or not more than 0.5.

The ratio of the proportions in cat % of the sum of the alkali metal oxides $R^{2+}$ to the sum of the alkaline earth metal oxides $R^+$ is optionally at least 4.4, in particular at least 5.45, or at least 6.0. In some embodiments, this ratio is not more than 14, not more than 13, or not more than 12.

In some embodiments of the disclosure, it relates to a glass comprising the following components:

| Component | Content |
|---|---|
| $Si^{4+}$ | 59-73 cat % |
| $Al^{3+}$ | 1.2-4 cat % |
| $B^{3+}$ | 0-6 cat % |
| $Li^+$ | 0-1 cat % |
| $Na^+$ | 10-17 cat % |
| $K^+$ | 10-14 cat % |
| $Mg^{2+}$ | 0-1 cat % |
| $Ca^{2+}$ | 0-1 cat % |
| $Sr^{2+}$ | 0-1 cat % |
| $Ba^{2+}$ | 1-5 cat % |
| Sum of $R^{2+}$ | 22-30 cat % |
| Sum of $R^+$ | 0-5 cat % |

In some embodiments $F^-$ may be present in the glass with 0-2 wt.-% and/or $Cl^-$ may be present in the glass with 0-1 wt.-% relative to the total weight of the glass composition. At least 96 wt.-%, at least 97 wt.-%, at least 98 wt.-%, at least 99 wt.-%, or up to 100 wt.-% of the anions may be oxygen. Oxygen may be present as the oxide of the respective cation, i.e., as $R_2O$ or RO, for example in form of $SiO_2$, $Al_2O_3$, $B_2O_3$, $Li_2O$, $Na_2O$, $K_2O$, MgO, CaO, SrO, BaO, etc.

In some embodiments the glasses provided according to the present disclosure can comprise $Si^{4+}$ in a proportion of at least 59 cat %. In some embodiments the content of $Si^{4+}$ has to be limited to not more than 73 cat %. The content of $Si^{4+}$ is optionally at least 60 cat %, at least 61 cat % or at least 62 cat %. In some embodiments, the content can be restricted to not more than 72 cat %, not more than 71 cat %, or not more than 70 cat %.

In some embodiments the glasses provided according to the present disclosure contain $Al^{3+}$ in a proportion of not more than 3 cat %. The content of this component can be limited to a maximum of 3 cat % or a maximum of 2.5 cat %. In some embodiments, $Al^{3+}$ is used in a small proportion of at least 0.25 cat %, at least 0.5 cat %, at least 1.0 cat %, or at least 1.5 cat %.

In some embodiments the glasses provided according to the present disclosure can contain $B^{3+}$ in a proportion of at least 1.0 cat %. It can be restricted to up to 5 cat %, up to 4.5 cat %, or up to 4 cat %. In some embodiments, the content of $B^{3+}$ is not more than 3.5 cat %. The content of $B^{3+}$ can be at least 1.5 cat %, or at least 2.0 cat %.

In some embodiments the glasses provided according to the present disclosure can contain $Li^+$ in a proportion of up to 1 cat %, up to 0.5 cat %, or up to 0.25 cat %. In some embodiments, the glass is free of $Li^+$.

In some embodiments the glasses provided according to the present disclosure contain $Na^+$ in a proportion of up to 17 cat %. The glass can comprise $Na^+$ in a proportion of at least 12 cat %, or at least 13 cat %. In some embodiments, the content of $Na^+$ is between 12 cat % and 17 cat %, or between 13 cat % and 15 cat %.

In some embodiments the glasses provided according to the present disclosure contain $K^+$ in a proportion of not more than 14 cat %. Its proportion can be at least 10.5 cat %, or at least 11.75 cat %. However, an excessively high potassium oxide content leads, due to the radioactive property of its isotope $^{40}K$, to a glass which is unsuitable for use in photomultipliers. For this reason, the content of this component must be restricted to not more than 14 cat %, or not more than 13 cat %. The glass can comprise $K^+$ in a proportion of at least 10.5 cat %, or at least 11.25 cat %. In some embodiments, the content of $K^+$ is between 10.5 cat % and 14 cat %, or between 11.25 cat % and 13 cat %.

In some embodiments of the disclosure, the glasses provided according to the present disclosure can contain $Mg^{2+}$ in a proportion of up to 1 cat %, or up to 1 cat %. Some embodiments are free of $Mg^{2+}$.

In some embodiments of the disclosure, the glasses provided according to the present disclosure can contain $Ca^{2+}$ in a proportion of up to 1 cat %, or up to 1 cat %. Some embodiments are free of $Ca^{2+}$.

In some embodiments of the disclosure, the glasses can contain $Sr^{2+}$ in a proportion of up to 1 cat %, up to 0.5 cat %, or up to 0.25 cat %. Some embodiments are free of $Sr^{2+}$ or contain only small amounts of $Sr^{2+}$, e.g., at least 0.015 cat %, at least 0.025 cat %, or at least 0.01 cat %. Some embodiments are free of $Sr^{2+}$.

In some embodiments of the disclosure, the glasses provided according to the present disclosure can contain $Ba^{2+}$ in a proportion of up to 4 cat % or up to 3 cat %. Exemplary embodiments contain $Ba^{2+}$ in proportions of at least 0.5 cat %, at least 1 cat %, or at least 1.5 cat %.

The glasses provided according to the present disclosure can contain $F^-$ in an amount of from 0 to 1 wt.-% relative to the total weight of the glass composition. The content of $F^-$ is optionally not more than 0.8 wt.-%. In some embodiments, at least 0.1 wt.-%, or at least 0.3 wt.-% of this component is used. The component $F^-$ improves the fusibility of the glass and influences the UV edge in the direction of shorter wavelengths.

The glasses provided according to the present disclosure can comprise $Cl^-$ in an amount of less than 1 wt.-% relative to the total weight of the glass composition, in particular less than 0.5 wt.-%, or less than 0.4 wt.-%. Suitable lower limits are 0.01 wt.-%, or 0.05 wt.-%.

In some embodiments, the ratio of the sum of the contents (in cat %) of $B^{3+}$, $R^{2+}$ and $R^+$ to the sum of the contents (in cat %) of $Si^{4+}$ and $Al^{3+}$ is not more than 0.51, in particular not more than 0.48, optionally not more than 0.47. In some embodiments, this value is at least 0.2, optionally at least 0.3, or at least 0.4.

In some embodiments of the present disclosure the ratio of the contents of $Na^+$ to $K^+$ in cat % is at least 0.5, in particular at least 0.75. In some embodiments, the specified ratio is not more than 3, in particular not more than 2. It has been found that the ratio indicated achieves the best results, i.e., the UV transmittance and the coefficient of thermal expansion are in advantageous ranges.

In some embodiments of the disclosure, the proportion of $R^{2+}$ in the glasses provided according to the present disclosure is optionally not more than 30 cat %, not more than 29 cat % or not more than 27 cat %. The glasses can contain $R^{2+}$ in proportions of at least 18.5 cat %, at least 19.5 cat %, or at least 20 cat %.

In some embodiments, the glass comprises at least small amounts of $Ba^{2+}$ and is free of $Ca^{2+}$ and/or $Mg^{2+}$ and/or $Sr^{2+}$.

In some embodiments, the glass has a ratio of $B^{3+}$ to $Ba^{2+}$ in cat % of at least 0.25 and not more than 3. The ratio is optionally at least 0.5 or at least 0.75. In some embodiments, the specified ratio is restricted to not more than 2.5, not more than 2, not more than 1.75, or not more than 1.5. In particular, the ratio is at least 1.1 and not more than 1.35.

In some embodiments, the sum of $R^+$ in the glasses provided according to the present disclosure can be at least 1 cat %, or at least 2 cat %. In some embodiments, the glass contains not more than 5 cat %, or not more than 4 cat %, or not more than 3 cat % of $R^+$.

In some embodiments, the sum of the contents in cat % of the alkaline earth metal oxides and alkali metal oxides, $R^+$+$R^{2+}$, can be limited to not more than 35 cat %. Exemplary embodiments can contain these components in amounts of not more than 32 cat %. The content of these oxides is optionally at least 25 cat %, at least 26 cat %, or at least 27 cat %.

In some embodiments, the ratio of the contents in cat % of $B^{3+}$ to the sum of the contents of $R^{2+}$ and $R^+$ in cat % can be at least 0.04, at least 0.05, or at least 0.068. The ratio can be limited to a maximum of 1.5, a maximum of 1.0, or a maximum of 0.5. It has been found to be advantageous to set the ratio indicated.

In some embodiments, the ratio of the content of $B^{3+}$ to the sum of the contents of $Si^{4+}$ and $Al^{3+}$ in cat % is at least 0.01 and/or not more than 0.1, or at least 0.03 and/or not more than 0.08.

In some embodiments, the ratio of the proportions in cat % of the sum of the alkali metal oxides $R^{2+}$ to the sum of the alkaline earth metal oxides $R^+$ is optionally at least 9, in particular at least 10 or at least 11. In some embodiments, this ratio is not more than 14, not more than 13 or not more than 12.

In some embodiments of the disclosure, it relates to a glass comprising the following components:

| Component | Content |
|---|---|
| $Si^{4+}$ | 64-71 cat % |
| $Al^{3+}$ | 1.5-3 cat % |
| $B^{3+}$ | 2-4 cat % |
| $Li^+$ | 0-1 cat % |
| $Na^+$ | 12-16 cat % |
| $K^+$ | 10-13 cat % |
| $Mg^{2+}$ | 0-1 cat % |
| $Ca^{2+}$ | 0-1 cat % |
| $Sr^{2+}$ | 0-1 cat % |
| $Ba^{2+}$ | 1-3 cat % |
| Sum of $R^{2+}$ | 22-30 cat % |
| Sum of $R^+$ | 1-4 cat % |

In some embodiments, $F^-$ may be present in the glass with 0-1 wt.-% and/or $Cl^-$ may be present in the glass with 0-1 wt.-% relative to the total weight of the glass composition. At least 96 wt.-%, at least 97 wt.-%, at least 98 wt.-%, at least 99 wt.-%, or up to 100 wt.-% of the anions may be oxygen. Oxygen may be present as the oxide of the respective cation, i.e., as $R_2O$ or RO, for example in form of $SiO_2$, $Al_2O_3$, $B_2O_3$, $Li_2O$, $Na_2O$, $K_2O$, MgO, CaO, SrO, BaO, etc.

In some embodiments of the disclosure, it relates to a glass comprising the following components:

| Component | Content |
|---|---|
| $Si^{4+}$ | 52-65 cat % |
| $Al^{3+}$ | 0-8 cat % |
| $B^{3+}$ | 18-32 cat % |
| $Li^+$ | 1-4 cat % |
| $Na^+$ | 0-6 cat % |
| $K^+$ | 0-3 cat % |
| $Mg^{2+}$ | 0-1 cat % |
| $Ca^{2+}$ | 0-2 cat % |
| $Ba^{2+}$ | 0-3 cat % |
| $Sr^{2+}$ | 0-1 cat % |
| Sum of $R^{2+}$ | 5-15 cat % |
| Sum of $R^+$ | 0-3 cat % |

In some embodiments, $F^-$ may be present in the glass with 0-2 wt.-% and/or $Cl^-$ may be present in the glass with 0-1 wt.-% relative to the total weight of the glass composition. At least 96 wt.-%, at least 97 wt.-%, at least 98 wt.-%, at least 99 wt.-%, or up to 100 wt.-% of the anions may be oxygen. Oxygen may be present as the oxide of the respective cation, i.e., as $R_2O$ or RO, for example in form of $SiO_2$, $Al_2O_3$, $B_2O_3$, $Li_2O$, $Na_2O$, $K_2O$, MgO, CaO, SrO, BaO, etc.

In some embodiments, the glasses provided according to the present disclosure can comprise $Si^{4+}$ in a proportion of at least 52 cat %. The content of $Si^{4+}$ must be limited to not more than 65 cat %. The content of $Si^{4+}$ is optionally at least 52 cat %, at least 53 cat % or at least 54 cat %. In some embodiments, the content can be restricted to not more than 65 cat %, not more than 64 cat %, or not more than 63 cat %.

In some embodiments the glasses provided according to the present disclosure contain $Al^{3+}$ in a proportion of not more than 8 cat %. The content of this component can thus be limited to a maximum of 7.5 cat %, or a maximum of 7 cat %. In some embodiments, $Al^{3+}$ is used in a small proportion of at least 1.5 cat %, at least 2 cat %, at least 2.5 cat %, or at least 3.0 cat %.

In some embodiments the glasses provided according to the present disclosure can contain $B^{3+}$ in a proportion of at least 18.0 cat %. It can be restricted to up to 32 cat %, up to 32.5 cat %, or up to 31.5 cat %. In some embodiments, the content of $B^{3+}$ is not more than 31 cat %. The content of $B^{3+}$ can be at least 18.5 cat %, or at least 19.0 cat %.

In some embodiments the glasses provided according to the present disclosure can contain $Li^+$ in a proportion of up to 4 cat %, up to 3.5 cat %, or up to 3 cat %. In some embodiments, the glass contains small proportions of $Li^+$, e.g., at least 0.15 cat %, at least 1.25 cat %, or at least 1.45 cat %. In some embodiments, the glass contains $Li^+$ between 0.25 and 4 cat %, between 1.75 and 3.25 cat %, or between 2.0 and 2.95 cat %.

In some embodiments the glasses provided according to the present disclosure contain $Na^+$ in a proportion of up to 6 cat %. The glass can comprise $Na^+$ in a proportion of at least 2 cat %, or at least 3 cat %. In some embodiments, the content of $Na^+$ is between 2 cat % and 6 cat %, or between 3 cat % and 5 cat %.

In some embodiments the glasses provided according to the present disclosure contain $K^+$ in a proportion of not more than 3 cat %. Its proportion can be at least 0.25 cat %, or at least 0.5 cat %. However, an excessively high potassium oxide content leads, due to the radioactive property of its isotope $^{40}K$, to a glass which is unsuitable for use in photomultipliers. For this reason, the content of this component has to be restricted to not more than 2 cat %, or not more than 1.5 cat %. The glass can comprise $K^+$ in a proportion of at least 0.5 cat %, or at least 0.75 cat %. In some embodiments, the content of $K^+$ is between 0.5 cat % and 3 cat %, or between 0.75 cat % and 2 cat %.

In some embodiments of the disclosure, the glasses provided according to the present disclosure can contain $Mg^{2+}$ in a proportion of up to 2 cat %, or up to 1 cat %. Some embodiments are free of $Mg^{2+}$.

In some embodiments of the disclosure, the glasses provided according to the present disclosure can contain $Ca^{2+}$ in a proportion of up to 2 cat %, or up to 1 cat %. Some embodiments are free of $Ca^{2+}$.

In some embodiments of the disclosure, the glasses can contain $Sr^{2+}$ in a proportion of up to 2 cat %, up to 1 cat %, or up to 0.5 cat %. Some embodiments are free of $Sr^{2+}$, or contain only small amounts of $Sr^{2+}$, e.g. at least 0.025 cat %, at least 0.05 cat %, at least 0.1 cat %. Some embodiments are free of $Sr^{2+}$.

In some embodiments of the disclosure, the glasses provided according to the present disclosure can contain $Ba^{2+}$ in a proportion of up to 2 cat %, or up to 1 cat %. Exemplary embodiments contain $Ba^{2+}$ in proportions of at least 0.05 cat %, at least 0.1 cat %, or at least 0.2 cat %.

The glasses provided according to the present disclosure can contain $F^-$ in an amount of from 0 to 2 wt.-% relative to the total weight of the glass composition. The content of $F^-$ is optionally not more than 1 wt.-%. In some embodiments, at least 0.1 wt.-% or at least 0.3 wt.-% of this component is used. The component $F^-$ improves the fusibility of the glass and influences the UV edge in the direction of shorter wavelengths.

The glasses provided according to the present disclosure can comprise $Cl^-$ in an amount of less than 1 wt.-% relative to the total weight of the glass composition, in particular less than 0.5 wt.-%, or less than 0.4 wt.-%. Suitable lower limits are 0.01 wt.-%, or 0.05 wt.-%.

In some embodiments, the ratio of the sum of the contents (in cat %) of $B^{3+}$, $R^{2+}$ and $R^+$ to the sum of the contents (in cat %) of $Si^{4+}$ and $Al^{3+}$ is not more than 0.8, in particular not more than 0.75, optionally not more than 0.7. In some embodiments, this value is at least 0.4, optionally at least 0.45, or at least 0.5.

In some embodiments of the present disclosure the ratio of the contents of $Na^+$ to $K^+$ in cat % is at least 1, in particular at least 2. In some embodiments, the specified ratio is not more than 4, in particular not more than 3. It has been found that the ratio indicated achieves the best results, i.e. the UV transmittance and the coefficient of thermal expansion are in advantageous ranges.

In some embodiments of the disclosure, the sum of $R^{2+}$ in the glasses provided according to the present disclosure is optionally not more than 11 cat %, not more than 10 cat % or not more than 9 cat %. The glasses can contain $R^{2+}$ in proportions of at least 7 cat %, at least 7.5 cat %, or at least 8 cat %.

In some embodiments, the ratio of $Ba^{2+}$ in cat % to the sum of the contents of $Mg^{2+}$, $Sr^{2+}$ and $Ca^{2+}$ in cat % should be at least 0.5. This value is optionally at least 0.6, at least 0.7. Nevertheless, the specified ratio should not exceed a value of 3 or of 2.5. In some embodiments, the glass comprises at least small amounts of $Ca^{2+}$ and/or $Ba^{2+}$ and is free of $Mg^{2+}$ and/or $Sr^{2+}$.

In some embodiments, the ratio of CaO/BaO is at least 0.25, at least 0.35 and not more than 2.0, or not more than 1.5.

In some embodiments, the glass has a ratio of $B^{3+}$ to $Ba^{2+}$ in cat % of at least 20 and not more than 100. The ratio is optionally at least 21 and at most 90. In some embodiments, the specified ratio is restricted to not more than 85, not more than 83, or not more than 82. In particular, the ratio is at least 23 and not more than 81.5.

In some embodiments, the sum of $R^+$ in the glasses provided according to the present disclosure can be at least 0.5 cat %, or at least 0.6 cat %. In some embodiments, the glass contains no more than 3 cat %, or no more than 2 cat %, or no more than 1.5 cat % of $R^+$.

In some embodiments, the sum of the contents in cat % of the alkaline earth metal oxides and alkali metal oxides, $R^+$+$R^{2+}$, can be limited to not more than 12 cat %. Exemplary embodiments can contain these components in amounts of not more than 11 cat %. The content of these oxides is optionally at least 6 cat %, at least 7 cat %, or at least 8 cat %.

In some embodiments, the ratio of the contents in cat % of $B^{3+}$ to the sum of the contents of $R^{2+}$ and $R^+$ in cat % can be at least 0.5, at least 1.0, or at least 1.5. The ratio can be limited to a maximum of 5, a maximum of 4.5, or a maximum of 4. It has been found to be advantageous to set the ratio indicated.

In some embodiments, the ratio of the content of $B^{3+}$ to the sum of the contents of $Si^{4+}$ and $Al^{3+}$ in cat % is at least 0.2 and/or not more than 0.8, or at least 0.3 and/or not more than 0.6.

In some embodiments, the ratio of the proportions in cat % of the sum of the alkali metal oxides $R^{2+}$ to the sum of the alkaline earth metal oxides $R^{+}$ is optionally at least 5, in particular at least 5.5 or at least 6. In some embodiments, this ratio is not more than 11, not more than 10.5, or not more than 10.

In some embodiments of the disclosure, it relates to a glass comprising the following components:

| Component | Content |
|---|---|
| $Si^{4+}$ | 53-61 cat % |
| $Al^{3+}$ | 4-7.5 cat % |
| $B^{3+}$ | 22-31 cat % |
| $Li^{+}$ | 1.5-3 cat % |
| $Na^{+}$ | 3.5-5 cat % |
| $K^{+}$ | 1-2 cat % |
| $Mg^{2+}$ | 0-1 cat % |
| $Ca^{2+}$ | 0-1 cat % |
| $Sr^{2+}$ | 0-1 cat % |
| $Ba^{2+}$ | 0-2 cat % |
| Sum of $R^{2+}$ | 5-15 cat % |
| Sum of $R^{+}$ | 0-2 cat % |

In some embodiments, $F^{-}$ may be present in the glass with 0-2 wt.-% and/or $Cl^{-}$ may be present in the glass with 0-1 wt.-% relative to the total weight of the glass composition. At least 96 wt.-%, at least 97 wt.-%, at least 98 wt.-%, at least 99 wt.-%, or up to 100 wt.-% of the anions may be oxygen. Oxygen may be present as the oxide of the respective cation, i.e., as $R_2O$ or RO, for example in form of $SiO_2$, $Al_2O_3$, $B_2O_3$, $Li_2O$, $Na_2O$, $K_2O$, MgO, CaO, SrO, BaO, etc.

In some embodiments of the disclosure, it relates to a glass comprising the following components:

| Component | Content |
|---|---|
| $Si^{4+}$ | 56-62 cat % |
| $Al^{3+}$ | 6-8 cat % |
| $B^{3+}$ | 22-28 cat % |
| $Li^{+}$ | 1-4 cat % |
| $Na^{+}$ | 1-6 cat % |
| $K^{+}$ | 1-3 cat % |
| $Mg^{2+}$ | 0-1 cat % |
| $Ca^{2+}$ | 0-2 cat % |
| $Ba^{2+}$ | 0-2 cat % |
| $Sr^{2+}$ | 0-1 cat % |
| Sum of $R^{2+}$ | 5-15 cat % |
| Sum of $R^{+}$ | 0-3 cat % |

In some embodiments $F^{-}$ may be present in the glass with 0-2 wt.-% and/or $Cl^{-}$ may be present in the glass with 0-1 wt.-% relative to the total weight of the glass composition. At least 96 wt.-%, at least 97 wt.-%, at least 98 wt.-%, at least 99 wt.-%, or up to 100 wt.-% of the anions may be oxygen. Oxygen may be present as the oxide of the respective cation, i.e., as $R_2O$ or RO, for example in form of $SiO_2$, $Al_2O_3$, $B_2O_3$, $Li_2O$, $Na_2O$, $K_2O$, MgO, CaO, SrO, BaO, etc.

In some embodiments the glasses provided according to the present disclosure can comprise $Si^{4+}$ in a proportion of at least 56 cat %. The content of $Si^{4+}$ must be limited to not more than 62 cat %. The content of $Si^{4+}$ is optionally at least 57 cat %, at least 57.5 cat %, or at least 58 cat %. In some embodiments, the content can be restricted to not more than 61 cat %, not more than 60 cat %, or not more than 59.8 cat %.

In some embodiments the glasses provided according to the present disclosure contain $Al^{3+}$ in a proportion of not more than 8 cat %. The content of this component can thus be limited to a maximum of 7.5 cat %, or a maximum of 7 cat %. In some embodiments, $Al^{3+}$ is used in a small proportion of at least 4.5 cat %, at least 5 cat %, at least 5.5 cat %, or at least 6.0 cat %.

In some embodiments the glasses provided according to the present disclosure can contain $B^{3+}$ in a proportion of at least 18.0 cat %. It can be restricted to up to 28 cat %, up to 27.5 cat %, or up to 26.5 cat %. In some embodiments, the content of $B^{3+}$ is not more than 26 cat %. The content of $B^{3+}$ can be at least 20.5 cat %, or at least 22.0 cat %.

In some embodiments the glasses provided according to the present disclosure can contain $Li^{+}$ in a proportion of up to 4 cat %, up to 3.5 cat % or up to 3 cat %. In some embodiments, the glass contains small proportions of $Li^{+}$, e.g., at least 0.15 cat %, at least 1.25 cat % or at least 1.45 cat %. In some embodiments, the glass contains $Li^{+}$ between 0.25 and 4 cat %, between 1.75 and 3.25 cat %, or between 2.0 and 2.95 cat %.

In some embodiments the glasses provided according to the present disclosure contain $Na^{+}$ in a proportion of up to 6 cat %. The glass can comprise $Na^{+}$ in a proportion of at least 2 cat % or at least 3 cat %. In some embodiments, the content of $Na^{+}$ is between 2 cat % and 6 cat %, or between 3 cat % and 5 cat %.

In some embodiments the glasses provided according to the present disclosure contain $K^{+}$ in a proportion of not more than 3 cat %. Its proportion can be at least 0.25 cat % or at least 0.5 cat %. However, an excessively high potassium oxide content leads, due to the radioactive property of its isotope $^{40}K$, to a glass which is unsuitable for use in photomultipliers. For this reason, the content of this component has to be restricted to not more than 2 cat % or not more than 1.5 cat %. The glass can comprise $K^{+}$ in a proportion of at least 0.5 cat % or at least 0.75 cat %. In some embodiments, the content of $K^{+}$ is between 0.5 cat % and 3 cat %, or between 0.75 cat % and 2 cat %.

In some embodiments of the disclosure, the glasses provided according to the present disclosure can contain $Mg^{2+}$ in a proportion of up to 2 cat %, or up to 1 cat %. Some embodiments are free of $Mg^{2+}$.

In some embodiments of the disclosure, the glasses provided according to the present disclosure can contain $Ca^{2+}$ in a proportion of up to 2 cat %, or up to 1 cat %. Some embodiments are free of $Ca^{2+}$.

In some embodiments of the disclosure, the glasses can contain $Sr^{2+}$ in a proportion of up to 1 cat %, up to 0.75 cat % or up to 0.5 cat %. Some embodiments are free of $Sr^{2+}$ or contain only small amounts of $Sr^{2+}$, e.g., at least 0.025 cat %, at least 0.05 cat %, at least 0.1 cat %. Some embodiments are free of $Sr^{2+}$.

In some embodiments of the disclosure, the glasses provided according to the present disclosure can contain $Ba^{2+}$ in a proportion of up to 2 cat %, or up to 1 cat %. Exemplary embodiments contain $Ba^{2+}$ in proportions of at least 0.05 cat %, at least 0.1 cat %, or at least 0.2 cat %.

The glasses provided according to the present disclosure can contain $F^{-}$ in an amount of from 0 to 2 wt.-% relative to the total weight of the glass composition. The content of $F^{-}$ is optionally not more than 1 wt.-%. In some embodiments, at least 0.1 wt.-%, or at least 0.3 wt.-% of this component is used. The component $F^-$ improves the fusibility of the glass and influences the UV edge in the direction of shorter wavelengths.

The glasses provided according to the present disclosure can comprise $Cl^-$ in an amount of less than 1 wt.-% relative to the total weight of the glass composition, in particular less than 0.5 wt.-%, or less than 0.4 wt.-%. Suitable lower limits are 0.01 wt.-%, or 0.05 wt.-%.

In some embodiments, the ratio of the sum of the contents (in cat %) of $B^{3+}$, $R^{2+}$ and $R^+$ to the sum of the contents (in cat %) of $Si^{4+}$ and $Al^{3+}$ is not more than 0.6, in particular not more than 0.55, optionally not more than 0.54. In some embodiments, this value is at least 0.4, optionally at least 0.45, or at least 0.5.

In some embodiments of the present disclosure the ratio of the contents of $Na^+$ to $K^+$ in cat % is at least 1, in particular at least 2. In some embodiments, the specified ratio is not more than 4, in particular, not more than 3. It has been found that the ratio indicated achieves the best results, i.e., the UV transmittance and the coefficient of thermal expansion are in advantageous ranges.

In some embodiments of the disclosure, the sum of $R^{2+}$ in the glasses provided according to the present disclosure is optionally not more than 11 cat %, not more than 10 cat % or not more than 9 cat %. The glasses can contain $R^{2+}$ in proportions of at least 7 cat %, at least 7.5 cat %, or at least 8 cat %.

In some embodiments, the ratio of $Ba^{2+}$ in cat % to the sum of the contents of $Mg^{2+}$, $Sr^{2+}$ and $Ca^{2+}$ in cat % should be at least 1. This value is optionally at least 1.5, at least 2.0. Nevertheless, the specified ratio should not exceed a value of 3, or of 2.5. In some embodiments, the glass comprises at least small amounts of $Ca^{2+}$ and/or $Ba^{2+}$ and is free of $Mg^{2+}$ and/or $Sr^{2+}$.

In some embodiments, the ratio of CaO/BaO is at least 0.25, at least 0.35 and not more than 1.0, or not more than 0.75.

In some embodiments, the glass has a ratio of $B^{3+}$ to $Ba^{2+}$ in cat % of at least 20 and not more than 30. The ratio is optionally at least 21 and at most 28. In some embodiments, the specified ratio is restricted to not more than 27, not more than 26, not more than 25. In particular, the ratio is at least 22 and not more than 24.5.

In some embodiments, the sum of $R^+$ in the glasses provided according to the present disclosure can be at least 1 cat %, or at least 1.25 cat %. In some embodiments, the glass contains not more than 3 cat %, or not more than 2 cat %, or not more than 1.5 cat % of $R^+$.

In some embodiments, the sum of the contents in cat % of the alkaline earth metal oxides and alkali metal oxides, $R^+ + R^{2+}$, can be limited to not more than 12 cat %. Exemplary embodiments can contain these components in amounts of not more than 11 cat %. The content of these oxides is optionally at least 9 cat %, at least 9.5 cat %, or at least 10 cat %.

In some embodiments, the ratio of the contents in cat % of $B^{3+}$ to the sum of the contents of $R^{2+}$ and $R^+$ in cat % can be at least 0.5, at least 1.0, or at least 1.5. The ratio can be limited to a maximum of 3.5, a maximum of 3, or a maximum of 2.5. It has been found to be advantageous to set the ratio indicated.

In some embodiments, the ratio of the content of $B^{3+}$ to the sum of the contents of $Si^{4+}$ and $Al^{3+}$ in cat % is at least 0.2 and/or not more than 0.8, or at least 0.3 and/or not more than 0.6.

In some embodiments, the ratio of the proportions in cat % of the sum of the alkali metal oxides $R^{2+}$ to the sum of the alkaline earth metal oxides $R^+$ is optionally at least 5, in particular at least 5.5 or at least 6. In some embodiments, this ratio is not more than 9, not more than 8.5, or not more than 7.

In some embodiments of the disclosure, it relates to a glass comprising the following components:

| Component | Content |
|---|---|
| $Si^{4+}$ | 58-61 cat % |
| $Al^{3+}$ | 6-7 cat % |
| $B^{3+}$ | 23-25 cat % |
| $Li^+$ | 2-3 cat % |
| $Na^+$ | 3-6 cat % |
| $K^+$ | 1-3 cat % |
| $Mg^{2+}$ | 0-1 cat % |
| $Ca^{2+}$ | 0-2 cat % |
| $Ba^{2+}$ | 0-2 cat % |
| $Sr^{2+}$ | 0-1 cat % |
| Sum of $R^{2+}$ | 7-12 cat % |
| Sum of $R^+$ | 0-3 cat % |

In some embodiments $F^-$ may be present in the glass with 0-1 wt.-% and/or $Cl^-$ may be present in the glass with 0-1 wt.-% relative to the total weight of the glass composition. At least 96 wt.-%, at least 97 wt.-%, at least 98 wt.-%, at least 99 wt.-%, or up to 100 wt.-% of the anions may be oxygen. Oxygen may be present as the oxide of the respective cation, i.e., as $R_2O$ or RO, for example in form of $SiO_2$, $Al_2O_3$, $B_2O_3$, $Li_2O$, $Na_2O$, $K_2O$, MgO, CaO, SrO, BaO, etc.

In the present description, "ppm" are proportions by mass.

When it is stated in the present description that the glass is free of a component or does not contain a particular component, it is meant by this that this component may be present at most as impurity. This means that it is not added in significant amounts. According to the disclosure, "not significant amounts" are, unless indicated otherwise for the component concerned, amounts of less than 500 ppm, optionally less than 250 ppm and optionally less than 50 ppm.

In some embodiments, "not significant amounts of trace elements" are, according to the disclosure, amounts of trace elements of less than 10 ppm, less than 5 ppm, less than 1 ppm, less than 0.5 ppm, less than 0.125 ppm and optionally less than 0.05 ppm of any element or oxide selected from the list consisting of BeO, $Bi_2O_3$, CdO, $CeO_2$, CoO, $Cr_2O_3$, CuO, $Dy_2O_3$, $Er_2O_3$, $Eu_2O_3$, $Ga_2O_3$, $Gd_2O_3$, $GeO_2$, $HfO_2$, $La_2O_3$, $MnO_2$, $MoO_3$, $Nb_2O_5$, NiO, PbO, $Pr_2O_3$, $PtO_2$, $Rb_2O$, $Sb_2O_3$, $Sc_2O_3$, $Sm_2O_3$, $SnO_2$, $Ta_2O_5$, $Tb_2O_3$, $Tm_2O_3$, $V_2O_5$, $WO_3$, $Y_2O_3$, $Yb_2O_3$, and ZnO.

In some embodiments, the disclosure relates to a glass, wherein the amount of Zr, respectively $ZrO_2$, in the glass is less than 150 ppm, or less than 140 ppm, or less than 130 ppm, or less than 120 ppm, or less than 110 ppm, or less than 50 ppm, or less than 20 ppm, or less than 10 ppm, or less than 5 ppm. Optionally the glass is free of Zr.

In some embodiments, the disclosure relates to a glass, wherein the amount of natural Hf, respectively $HfO_2$, in the glass is less than 10 ppm, or less than 9 ppm, or less than 8 ppm, or less than 7 ppm, or less than 6 ppm, or less than 5 ppm, or less than 4 ppm, or less than 3 ppm, or less than 2 ppm, or less than 1 ppm. Optionally the glass is free of Hf.

Iron contents are for the purposes of the present description expressed as proportions by weight of $Fe_2O_3$ in ppm. This value can be determined in a manner with which a person skilled in the art will be familiar by determining the amounts of all iron species present in the glass and, for the calculation of the proportion by mass, assuming that all iron is present as $Fe_2O_3$. Thus, if 1 mmol of iron is found in the glass, the mass assumed for the calculation is 159.70 mg of $Fe_2O_3$. This procedure takes into account the fact that the amounts of the individual iron species in the glass cannot be determined reliably or can be determined only with great difficulty. In some embodiments, the glass contains less than 100 ppm of $Fe_2O_3$, in particular less than 50 ppm or less than 10 ppm. In some embodiments having a particularly low iron content, the proportion of $Fe_2O_3$ is less than 6 ppm, less than 5 ppm or less than 4.5 ppm. The content of $Fe_2O_3$ is optionally in the range from 0 to 4.4 ppm, from 0 to 4.0 ppm, from 0 to 3.5 ppm, from 0 to 2.0 ppm, from 0 to 1.75 ppm. In some embodiments, the content can be in the range from 0 to 1.5 ppm, or optionally from 0 to 1.25 ppm. In some embodiments, the glass is free of any contamination with $Fe_2O_3$.

In some embodiments, the glass contains less than 100 ppm of $TiO_2$, in particular less than 50 ppm or less than 10 ppm. In some embodiments having a particularly low $TiO_2$ content, the glass contains less than 7 ppm, less than 6 ppm, less than 5 ppm or less than 4 ppm. The content of $TiO_2$ is optionally in the range from 0 to 6.9 ppm, from 0 to 5.8 ppm, from 0 to 4.7 ppm, from 0 to 3.8 ppm or from 0 to 2.5 ppm. In some embodiments, the proportion of this component can be in the range from 0 to 1.5 ppm, from 0 to 1.0 ppm, from 0 to 0.75 ppm, from 0 to 0.5 ppm and optionally from 0 to 0.25 ppm. In some embodiments, the glass is free of any contamination with $TiO_2$.

In some embodiments, the glass comprises less than 100 ppm of arsenic, in particular less than 50 ppm or less than 10 ppm. The glass may comprise less than 100 ppm of antimony, less than 50 ppm of antimony or less than 10 ppm of antimony. Arsenic and antimony are toxic and hazardous to the environment; in addition, they both increase the solarisation of the glass.

If it is indicated in this description with reference to a chemical element (e.g., As, Sb) that this component is not present, this statement applies, unless indicated otherwise in the particular case, to any chemical form. For example, the statement that the glass has an As content of less than 10 ppm means that the sum of the proportions by mass of the As species present (e.g. $As_2O_3$, $As_2O_5$, etc.) together does not exceed the value of 10 ppm.

In some embodiments, the glass has a refractive index nd of from 1.45 to 1.55. The refractive index can be less than 1.50.

The production process of the glass comprises the following steps:

a) Melting glass raw materials in a melting tank containing refractory material at temperatures of 1500° C. or more, b) Optionally refining the melt in a refining tank containing refractory material, c) Cooling the melt, wherein the glass melt comes into contact with the refractory material of the melting tank and/or of the optional refining tank, wherein the proportion of $ZrO_2$ in the refractory material of the melting tank and of the optional refining tank is in an amount of less than 5 wt.-%, less than 4 wt.-%, less than 3 wt.-%, less than 2 wt.-%, or less than 1 wt.-%. In exemplary embodiments, less than 0.25 wt.-%, less than 0.15 wt.-%, less than 0.05 wt.-%, or less than 0.01 wt.-%. In some embodiments the refractory material is free of Zr, and/or $ZrO_2$.

The refractory material should be selected with the view to the acceptable level of contaminants by the following formula:

$$\text{Contaminants [in ppm]} = C_{uv} * K * A / D$$

wherein $C_{uv}$ is the concentration of contaminants in the refractory material [in ppm]; $C_{uv}$ (sum of Fe, Ti, Pt, Zr, and Hf) should be less than 1000 ppm, optionally less than 500 ppm, optionally less than 100 ppm, less than 10 ppm;

wherein K is the corrosion-rate [mm/d] at a temperature corresponding to a glass melt viscosity of about $10^2$ dPas, the corrosion-rate being the amount of refractory material lost to the melt, indicated as the material thickness loss in a direction perpendicular to the contact-area of the refractory material and the glass melt per day;

wherein A is the contact-area of the melt with the refractory material [$m^2$];

wherein D is the throughput of glass [t/d].

Contaminants should be less than 20 ppm, or less than 10 ppm, or less than 5 ppm.

In some embodiments, the refractory material comprises $Al_2O_3$ in an amount of less than 5 wt.-%, less than 4 wt.-%, less than 3 wt.-%, less than 2 wt.-%, or less than 1 wt.-%. In exemplary embodiments less than 0.25 wt.-%, less than 0.15 wt.-%, less than 0.05 wt.-%, or less than 0.01 wt.-% $Al_2O_3$. In some embodiments the refractory material is free of $Al_2O_3$.

It was found that in the glass of this disclosure, reducing conditions during the melt may increase the absorption at about 200 nm. Thus, it is desired to choose reducing melting conditions during production of the glass to an extent that leads to a low transmittance at about 200 nm. This can be achieved, for example, by addition of one or more reducing agents, such as sugar (reducing saccharides, e.g., sucrose), during the melt, in particular in an amount of from 0.1 to 1.0 wt.-%, for example from 0.2 to 0.6 wt.-%. However, the conditions should not be too reducing in order to avoid high proportions of $Fe^{2+}$ species that may have a negative impact on the transmittance at 220 nm.

In some embodiments of the disclosure, the partial pressure of oxygen ($pO_2$) in the glass melt at a temperature of 1500° C. is 0.5 bar or less when the glass melt is produced from the glass by inductively heating to a temperature of 1500° C. in a platinum crucible under argon atmosphere.

The $pO_2$ at 1500° C. may for example be at most 0.4 bar, at most 0.3 bar, or at most 0.2 bar. In some embodiments, the $pO_2$ may for example be at least 0.01 bar, at least 0.02 bar, at least 0.05 bar, or at least 0.1 bar. The $pO_2$ may for example be from 0.01 bar to 0.5 bar, from 0.02 bar to 0.4 bar, from 0.05 bar to 0.3 bar, or from 0.1 bar to 0.2 bar.

One aspect of the present disclosure is the use of crucibles and other contact materials which come into direct contact with the molten class material is free of any contaminants, such as zirconium, hafnium, titanium, platinum, and any other material which interferes with the radiation to be detected.

In some embodiments of the present disclosure the crucibles and other contact materials used during the production process are at least in part made of $SiO_2$.

If a reference is made herein to a chemical element, then this statement refers to any chemical form (e.g., all oxides, isotopes, etc.), unless otherwise stated in the individual case. For example, the statement that the glass has a content of Zr of less than 100 ppm means that the sum of the mass fractions of the Zr species (e.g., $Zr^0$, $ZrO_2$, etc.) does not exceed the value of 100 ppm.

EXAMPLES

Example 1. Production Process

The inventive glasses the produced by the following process:

The raw material, free of any contaminants, was mixed and then melted in a melting tank containing refractory material at temperatures of at least 1500° C., at least 1600° C. for about 6-8 h hours.

In some embodiments the melt was further refined in a refining tank also containing refractory material.

It is important that the refractory material of the melting tank and/or of the refining tank comprise $ZrO_2$ in an amount of less than 5 wt.-%, less than 4 wt.-%, less than 3 wt.-%, less than 2 wt.-%, or less than 1 wt.-%. In exemplary embodiments less than 0.25 wt.-%, less than 0.15 wt.-%, less than 0.05 wt.-%, or less than 0.01 wt.-%. In some embodiments the refractory material is free of Zr, and/or $ZrO_2$. Then the melt was cooled down and the glass was further processed to its final form (for example by down-draw processes).

Example 2. Analysis of Exemplary Glass

Depicted is the analysis of one of the glasses with respect to trace elements by Laser Ablation-Inductively Coupled Plasma Mass Spectrometry (LA-ICP-MS):

| Component | ppm (wt/wt) |
|---|---|
| $As_2O_3$ | <3 ppm |
| BeO | <3 ppm |
| $Bi_2O_3$ | <3 ppm |
| CdO | <3 ppm |
| $CeO_2$ | <3 ppm |
| CoO | <3 ppm |
| $Cr_2O_3$ | <3 ppm |
| CuO | 4.4 ± 1.3 ppm |
| $Dy_2O_3$ | <3 ppm |
| $Er_2O_3$ | <3 ppm |
| $Eu_2O_3$ | <3 ppm |
| $Fe_2O_3$ | 11 ± 3.0 ppm |
| $Ga_2O_3$ | <3 ppm |
| $Gd_2O_3$ | <3 ppm |
| $GeO_2$ | <3 ppm |
| $HfO_2$ | 3.2 ± 1.0 ppm |
| $La_2O_3$ | <3 ppm |
| $MnO_2$ | <3 ppm |
| $MoO_3$ | <3 ppm |
| $Nb_2O_5$ | <3 ppm |
| NiO | <3 ppm |
| PbO | <3 ppm |
| $Pr_2O_3$ | <3 ppm |
| $PtO_2$ | <1 ppm |
| $Rb_2O$ | 12 ± 4 ppm |
| $Sb_2O_3$ | <3 ppm |
| $Sc_2O_3$ | <3 ppm |
| $Sm_2O_3$ | <3 ppm |
| $SnO_2$ | <3 ppm |
| $Ta_2O_5$ | <3 ppm |
| $Tb_2O_3$ | <3 ppm |
| $TiO_2$ | 6.8 ± 2.0 ppm |
| $Tm_2O_3$ | <3 ppm |
| $V_2O_5$ | <3 ppm |
| $WO_3$ | <3 ppm |
| $Y_2O_3$ | <3 ppm |
| $Yb_2O_3$ | <3 ppm |
| ZnO | 29 ± 9 ppm |

Example 3. Comparative Glasses

Figure 2:
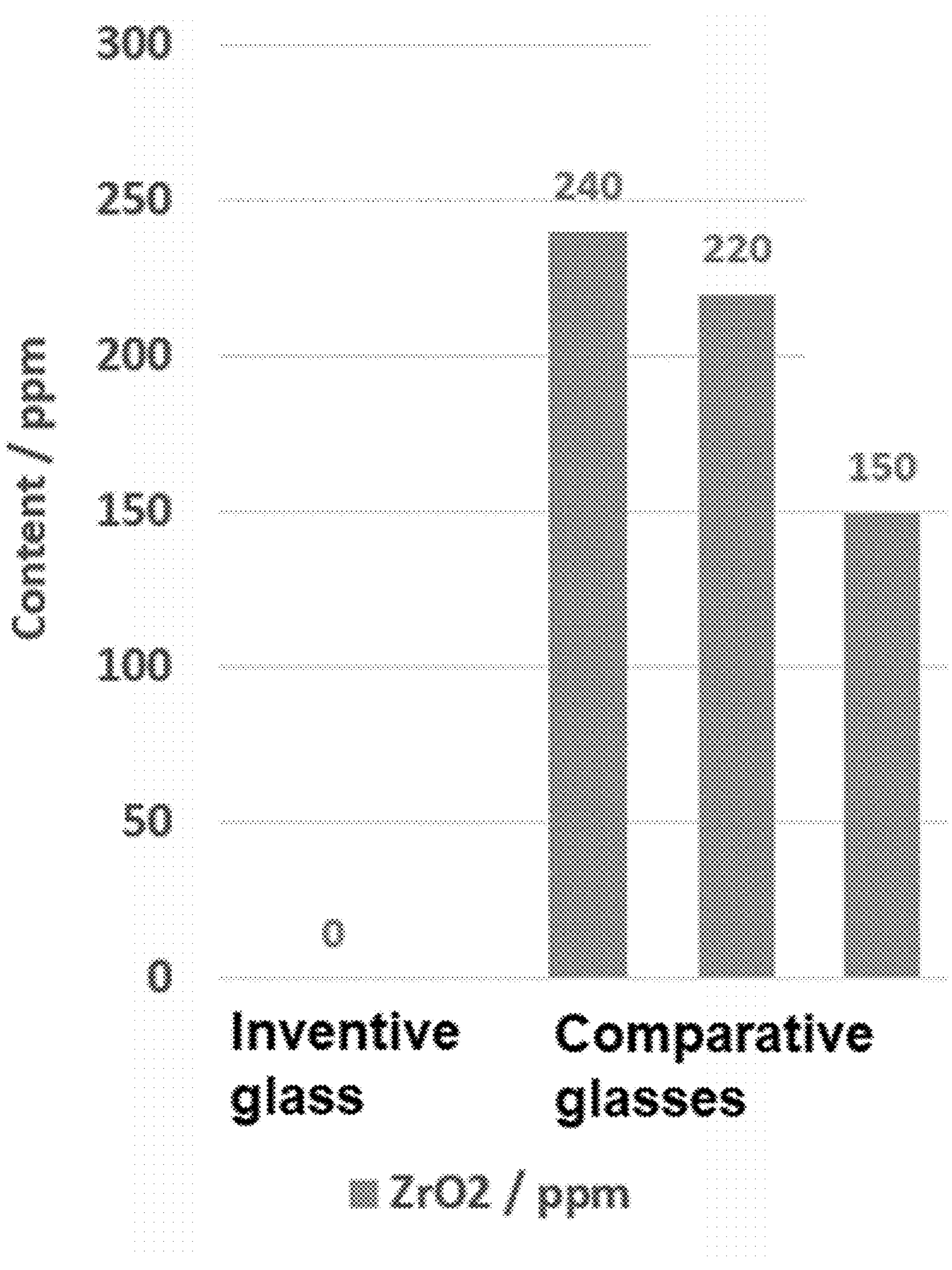
FIG. 2 shows the results of the $ZrO_2$-analysis of different glasses, with the glass provided according to the disclosure being virtually free of $ZrO_2$ whereas comparative glasses made by conventional methods contain significant amounts of $ZrO_2$.
Figure 3:
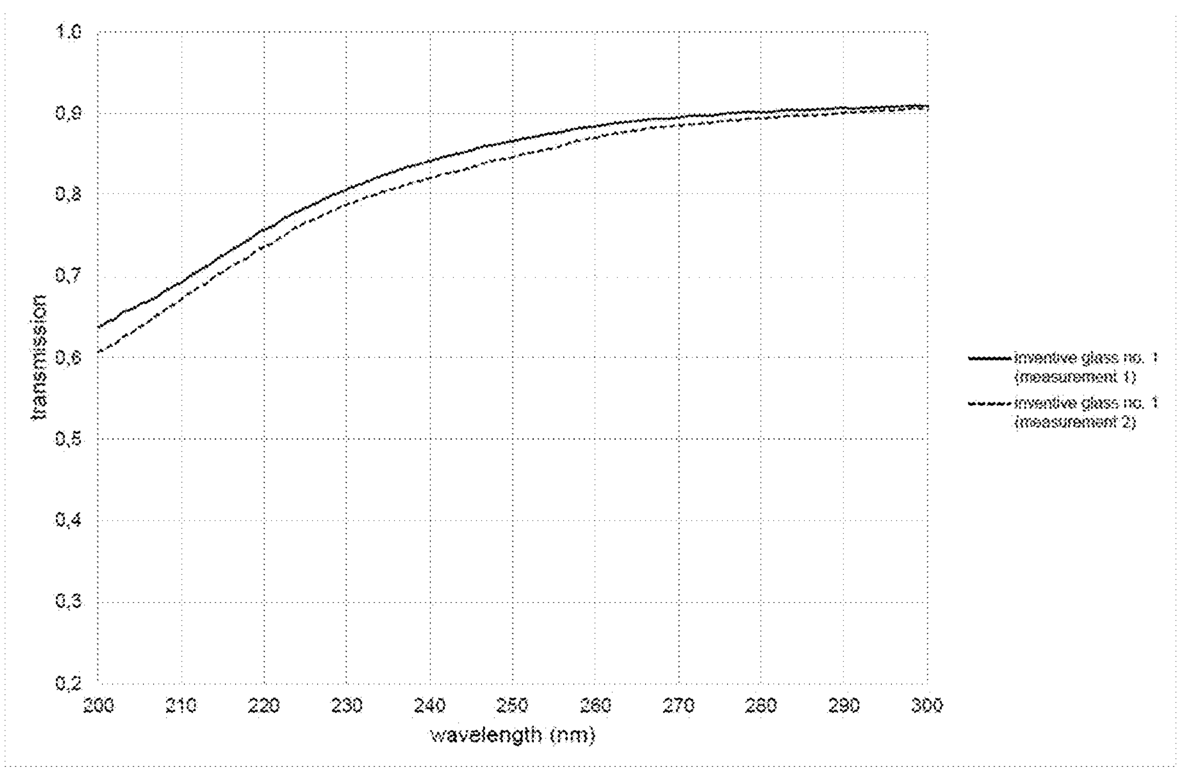
FIGS. 3-5 show the UV-transmittance profile for glasses provided according to the present disclosure and comparative glasses made with conventional production methods, depicted are two or three measurements with the same glasses (inventive glass 1, comparative glasses 2 and 3) with transmittance as the y-axis vs. wavelength as the x-axis showing that the transmittance at lower wavelengths is better for the inventive glass.
Figure 4:
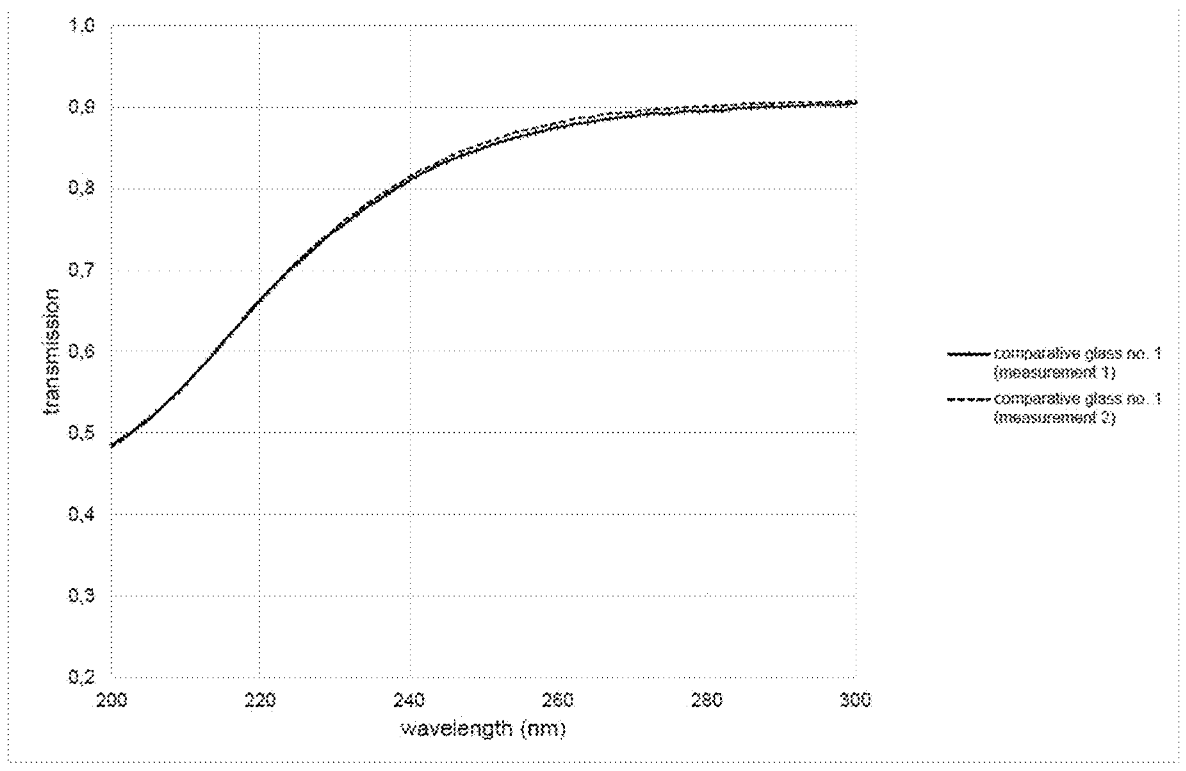
Figure 5:
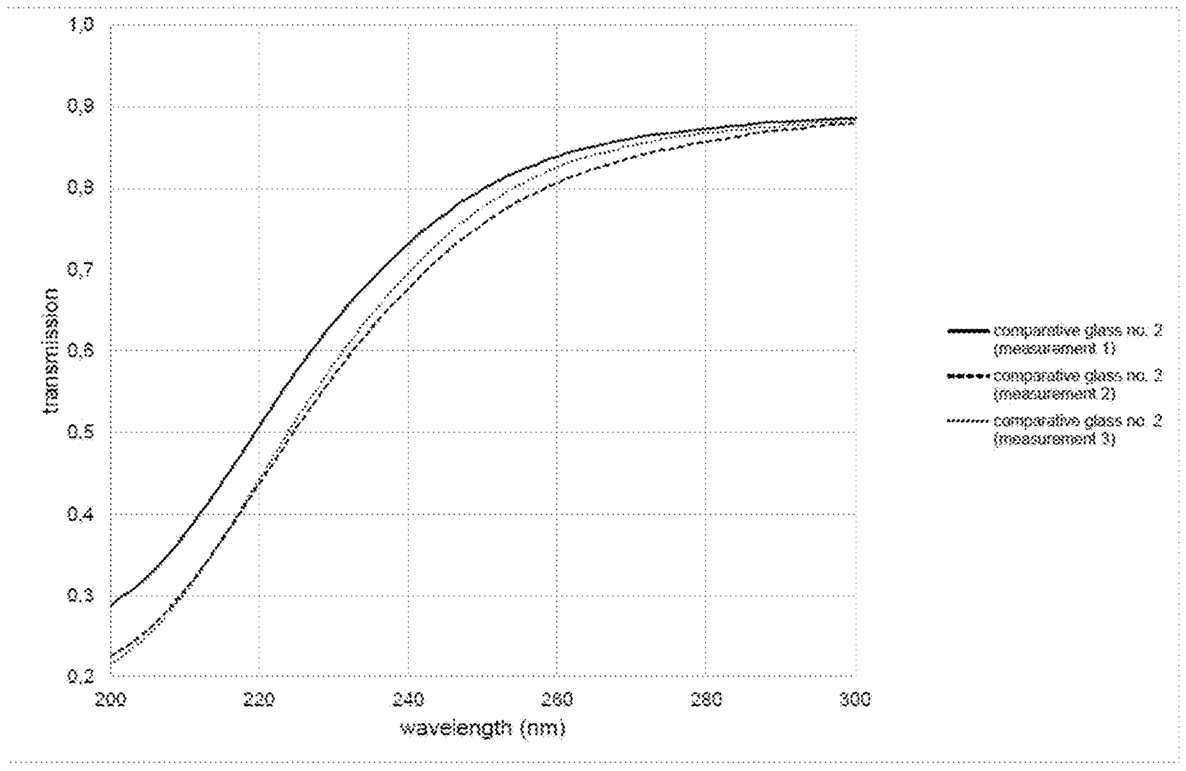

In one experiment, a glass provided according to the disclosure and three comparative UVC-glasses, made with conventional melting methods in $ZrO_2$-containing crucibles (comparative glasses 1-3) were analyzed for their $ZrO_2$-content (cf. FIG. 2). It became apparent, that the inventive glass is virtually free of $ZrO_2$, whereas the three commercially available UVC-glasses still comprise significant amounts of $ZrO_2$.

In another experiment, two exemplary glasses 1 and 2 provided according to the disclosure and another comparative UVC-glass, made with conventional melting methods in $ZrO_2$-containing crucibles (comparative glass 4) were analyzed for their $ZrO_2$-content (cf. Table 1). It became apparent, that the inventive glass is virtually free of $ZrO_2$, whereas the three commercially available UVC-glasses still comprise significant amounts of $ZrO_2$. It turned out that comparative glass could not be used in radiation detectors due to the contaminations.

TABLE 1

| cations/anions | 1 | 2 | Comparative glass 4 |
|---|---|---|---|
| $Si^{4+}$ [cat %] | 65.8 | 58.8 | 64.4 |
| $Al^{3+}$ [cat %] | 2.2 | 6.5 | 1.6 |
| $B^{3+}$ [cat %] | 3.1 | 24.2 | 4.3 |
| $Na^{+}$ [cat %] | 14.4 | 4.4 | 16.9 |
| $K^{+}$ [cat %] | 12.2 | 1.7 | 10.3 |
| $Li^{2+}$ [cat %] | 0 | 2.8 | 0 |
| $Sr^{2+}$ [cat %] | 0 | 0.01 | <0.1 |
| $Ba^{2+}$ [cat %] | 2.4 | 1.0 | 2.5 |
| $F^{-}$ [wt.-%] | 0.4 | 0.9 | <0.01 |
| $Cl^{-}$ [wt.-%] | 0.3 | 0.1 | 0.5 |
| $Fe_2O_3$ [ppm] | 2 | 9 | 7.7 |
| $TiO_2$ [ppm] | 3 | 6 | 5.8 |
| $MoO_3$ [ppm] | <3 | <3 | 0.4 |
| $Cr_2O_3$ [ppm] | <3 | 1.5 | 0.5 |
| $ZrO_2$ [ppm] | <3 | <3 | 240 |
| IST-thickness of sample | 0.70 | 0.64 | 0.72 |
| T % @ 254 nm, d(IST)mm/% | 87.0 | 82.4 | 82.2 |
| T % @ 254 nm, d(calc) = 0.7 mm/% | 87.0 | 81.6 | 82.6 |
| T % @ 254 nm, d(calc) = 1 mm/% | 85.2 | 77.8 | 76.1 |

Example 4. Corrosion of Refractory Crucibles

The static corrosion test is used to assess the corrosion resistance of a material compared to a glass melt. The test is at a temperature of between 1550° C. and 1650° C. (heating rate between 60 and max. 100 K/h) for 24 h.

First, the previously measured samples are cemented into the holder and placed in the intended oven. The Pt crucible with the corresponding glass melt is placed underneath. Once the furnace has reached the appropriate temperature, the samples are placed in the glass melt immersed and pulled out again after a corresponding holding time at the test temperature.

Corrosion in a glass tank usually only occurs on one side. Therefore, the corrosion removal of the corroded samples at and below the flushing joint is also only a one-sided removal evaluated.

The depth of the flushing joint and the mean removal are used to determine the corrosion removal considered below the flushing joint. In any case, the calculation is carried out for the two halves of the sample.

The following formulas are used to calculate the removal:

$$\overline{d_i} = \frac{\sum_{x=1}^{2} S_x}{2}$$

$$\overline{A} = \frac{d_a - \overline{d_i}}{2}$$

Here, $d_i$ denotes the mean thickness of the sample after the test at point i, $S_x$ the thickness at the measured point on sample 1 (x=1) and sample 2 (x=2), A the average one-sided removal at point i and $d_a$ the thickness of the sample at the beginning. This calculation is repeated for the flushing joint (the thinnest point of the sample) and four other points. Thereafter is again averaged over the four points below the flushing joint.

$$\overline{d_{corr}} = \frac{\sum_{i=1}^{4} d_i}{4}$$

Since some materials grow or shrink, becomes the determined values for the removal the shrinkage (Sw) of the material is calculated as follows:

$$Sw = 100 * \frac{(d_a - S_x)}{d_a}$$

Both $d_a$ (thickness of the sample at the beginning) and $S_x$ (thickness of the sample after test) at the uppermost point of the sample (if possible, within the cemented area, measured without glass vapor contact).

A material for refractory crucibles comprising the following components:

| component | Content [wt.-% ] |
|---|---|
| $SiO_2$ | >99.6% |
| $Al_2O_3$ | 0.12% |
| $Fe_2O_3$ | 0.10% |
| $TiO_2$ | 0.027% |
| MgO | 0.013% |
| $Na_2O$ | 0.008% |
| CaO | 0.007% |
| $K_2O$ | 0.005% |

It has been surprisingly found that although the new material corrodes quicker in the glass melt, the contamination with Zr, Cr, Fe, Mn, Pt, Ti, and Ni is significant lower as compared to conventional aluminium-zirconium-silicate (AZS) or Korvisit A®-material.

For example, contamination of the glass melt when using AZS is depicted as follows:

| Element | Result |
|---|---|
| Cr | 1.5 ± 0.4 [mg/kg] |
| Fe | 277 ± 55[] [mg/kg] |
| Mn | 18 ± ]4 [mg/kg] |
| Ni | 0.64 ± 0.13 [mg/kg] |
| Ti | 105 ± 23 [mg/kg] |
| Zr | 310 ± 58 [mg/kg] |

Example 5. Contamination with Radionuclides

Comparative glass made in glass melt crucibles made of AZS (with 40 wt.-% Zr) was analyzed with Gamma spectrometry. Only natural radioactive nuclides from the U-238, U-235- and Th-232 decay chain were detected, which may be contaminants accompanying zirconium as present in the AZS refractory material. Ir-192 and K-40 were below the respective detection limit. In the gamma spectrometric measurement, a daughter product of Ra-228 shows a signal at a similar energy like Ir-192, which might lead to false positive results for Ir-192, depending on the kind of the measurement device.

| Parameter | Unit | Result | rel. MU [%] |
|---|---|---|---|
| U-238 decay chain | | | |
| U-238 | Bq/g | 1.45 | 10 |
| Ra-226 | Bq/g | 1.42 | 10 |
| Pb-210 | Bq/g | 0.689 | 26 |
| U-235 decay chain | | | |
| U-235 | Bq/g | 0.067 | 10 |
| Th-232 decay chain | | | |
| Ra-228 | Bq/g | 0.302 | 7.7 |
| Th-228 | Bq/g | 0.301 | 7.2 |
| Others | | | |
| K-40 | Bq/g | <0.051 | — |
| Ir-192 | Bq/g | <0.0068 | — |

rel. MU = relative measurement uncertainty

In a second experiment comparative glass made in other glass melt crucibles made of AZS with 65 wt.-% Zr, was analyzed with Gamma spectrometry. Only natural radioactive nuclides from the U-238, U-235- and Th-232 decay chain were detected, which may be contaminants accompanying zirconium as present in the AZS refractory material. Ir-192 and K-40 were below the respective detection limit. In the gamma spectrometric measurement, a daughter product of Ra-228 shows a signal at a similar energy like Ir-192, which might lead to false positive results for Ir-192, depending on the kind of the measurement device.

| Parameter | Unit | Result | rel. MU [%] |
|---|---|---|---|
| U-238 decay chain | | | |
| U-238 | Bq/g | 3.15 | 13 |
| Ra-226 | Bq/g | 3.40 | 10 |
| Pb-210 | Bq/g | 1.69 | 60 |
| U-235 decay chain | | | |
| U-235 | Bq/g | 0.145 | 13 |
| Th-232 decay chain | | | |
| Ra-228 | Bq/g | 0.625 | 7.5 |
| Th-228 | Bq/g | 0.637 | 8.2 |
| Further Radionuclides | | | |
| K-40 | Bq/g | <0.043 | — |
| Ir-192 | Bq/g | <0.0015 | — |

rel. MU = relative measurement uncertainty

Example 6. Neutron Detection

A neutron-sensitive scintillating glass fiber detector is tested with glass fibers made of the inventive glasses 1 and 2 (cf. example 3) and comparative glass 4 (cf. example 3).

Neutron absorption detection varies with the inventive glasses by only±3%, whereas the variation of neutron absorption detection with comparative glass 4 varies by about ±10%. Furthermore, for comparison, the intrinsic thermal-neutron detection efficiency as a function of thermal-neutron beam position along the foil span is experimentally measured for both detector configurations. Detection efficiencies of 16.16% (comparative glass 4) vs. 44.08% (inventive glass 2) and 53.04% (inventive glass 1), respectively, are measured.

This shows the superiority of the inventive glasses when used in neutron detectors.1

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A glass having a transmittance at a reference thickness of 1.0 mm of at least 65.0% at a wavelength of 260 nm, wherein an amount of $ZrO_2$ in the glass is less than 150 ppm, wherein the glass comprises the following components in the indicated amounts (in cat %):

| | |
|---|---|
| $Si^{4+}$ | 64-71 cat %; |
| $Al^{3+}$ | 1.5-3 cat %; |
| $B^{3+}$ | 2-4 cat %; |
| $Li^{+}$ | 0-1 cat %; |
| $Na^{+}$ | 12-16 cat %; |
| $K^{+}$ | 10-13 cat %; |
| $Mg^{2+}$ | 0-1 cat %; |
| $Ca^{2+}$ | 0-1 cat %; |
| $Sr^{2+}$ | 0-1 cat %; |
| $Ba^{2+}$ | 1-3 cat %; |
| Sum of $R^{+}$ | 22-30 cat %; and |
| Sum of $R^{2+}$ | 1-4 cat %, |

wherein $R^{+}$ is the sum of all cations of all alkali metals in the glass and $R^{2+}$ is the sum of all cations of all alkaline earth metals in the glass.

2. The glass of claim 1, wherein an amount of $HfO_2$ in the glass is less than 10 ppm.

3. The glass of claim 1, wherein the glass has an emission of alpha particles of less than 4.42 Becquerel per gram of glass.

4. The glass of claim 1, wherein an amount of one or more of $Fe_2O_3$, $MoO_3$ and $WO_3$ in the glass is less than 10 ppm.

5. The glass of claim 1, wherein an amount of $TiO_2$ in the glass is less than 20 ppm.

6. The glass of claim 1, wherein a content of $F^-$ present in the glass is 0-3 wt.-% and/or a content of Cl present in the glass is 0-1 wt.-% relative to a total weight of the glass composition, and wherein at least 96 wt.-% of anions in the glass are present as oxygen.

7. The glass of claim 1, wherein the transmittance at the wavelength of 260 nm is more than 75% at a reference thickness of 1 mm.

8. The glass of claim 1, wherein an amount of oxides of one or more of gallium, uranium, thorium, yttrium and thallium in the glass is at most 3 ppm.

9. A radiation and/or particle detector, comprising:

a glass having a transmittance at a reference thickness of 1.0 mm of at least 65.0% at a wavelength of 260 nm, wherein an amount of $ZrO_2$ in the glass is less than 150 ppm, wherein the glass comprises the following components in the indicated amounts (in cat %):

| | |
|---|---|
| $Si^{4+}$ | 64-71 cat %; |
| $Al^{3+}$ | 1.5-3 cat %; |
| $B^{3+}$ | 2-4 cat %; |
| $Li^{+}$ | 0-1 cat %; |
| $Na^{+}$ | 12-16 cat %; |
| $K^{+}$ | 10-13 cat %; |
| $Mg^{2+}$ | 0-1 cat %; |
| $Ca^{2+}$ | 0-1 cat %; |
| $Sr^{2+}$ | 0-1 cat %; |
| $Ba^{2+}$ | 1-3 cat %; |
| Sum of $R^{+}$ | 22-30 cat %; and |
| Sum of $R^{2+}$ | 1-4 cat %, wherein $R^{+}$ is the sum of all cations of all alkali metals in the glass and $R^{2+}$ is the sum of all cations of all alkaline earth metals in the glass. |

10. The radiation and/or particle detector of claim 9, wherein the radiation and/or particle detector is selected from the group consisting of a neutron-detector, a neutrino-detector, a photomultiplier, and an ultraviolet-C detector.

* * * * *